US010261790B2

(12) United States Patent
Mishaeli

(10) Patent No.: US 10,261,790 B2
(45) Date of Patent: Apr. 16, 2019

(54) MEMORY COPY INSTRUCTIONS, PROCESSORS, METHODS, AND SYSTEMS

(71) Applicant: INTEL CORPORATION, Santa Clara, CA (US)

(72) Inventor: Michael Mishaeli, Zichron Yaakov (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/086,686

(22) Filed: Mar. 31, 2016

(65) Prior Publication Data

US 2017/0285959 A1 Oct. 5, 2017

(51) Int. Cl.
  *G06F 9/30* (2018.01)
  *G06F 9/38* (2018.01)
(52) U.S. Cl.
  CPC ........ *G06F 9/3004* (2013.01); *G06F 9/30032* (2013.01); *G06F 9/3861* (2013.01)
(58) Field of Classification Search
  CPC . G06F 3/00; G06F 3/06; G06F 3/0601; G06F 3/0602; G06F 3/0604–3/0626; G06F 3/0628–3/0649; G06F 3/065; G06F 3/0652–3/0671; G06F 3/0673–3/0689; G06F 9/00; G06F 9/22; G06F 9/30–9/30036; G06F 9/3004–9/3016; G06F 9/30163–9/30196;
  (Continued)

(56) References Cited

U.S. PATENT DOCUMENTS 4,924,425 A * 5/1990 Koga .................. G06F 12/0859
  711/158
5,537,620 A * 7/1996 Breternitz, Jr. ......... G06F 8/443
  717/150
(Continued)

FOREIGN PATENT DOCUMENTS

WO 2017/172259 A1 10/2017

OTHER PUBLICATIONS

The CPU and the Fetch Decode Execute cycle; The Teacher; Dec. 13, 2014; retrieved from https://web.archive.org/web/20141213144044/http://theteacher.info/index.php/hardware-components/notes-q-a-and-worksheets/1659-the-cpu-and-the-fetch-decode-execute-cycle on May 1, 2018 (Year: 2014).*

(Continued)

*Primary Examiner* — Daniel C Chappell
(74) *Attorney, Agent, or Firm* — Nicholson De Vos Webster & Elliott LLP

(57) ABSTRACT

A processor includes a decode unit to decode a memory copy instruction that indicates a start of a source memory operand, a start of a destination memory operand, and an initial amount of data to be copied from the source memory operand to the destination memory operand. An execution unit, in response to the memory copy instruction, is to copy a first portion of data from the source memory operand to the destination memory operand before an interruption. A descending copy direction is to be used when the source and destination memory operands overlap. In response to the interruption, when the descending copy direction is used, the execution unit is to store a remaining amount of data to be copied, but is not to indicate a different start of the source memory operand, and is not to indicate a different start of the destination memory operand.

25 Claims, 16 Drawing Sheets

(58) Field of Classification Search
CPC ......... G06F 9/32–9/3897; G06F 9/44–9/4893;
G06F 11/1402; G06F 11/2056; G06F
15/76–15/825; G06F
2003/0691–2003/0698; G06F
2015/761–2015/768; G06F
2201/00–2201/885; G06F 2203/00; G06F
2206/00–2206/1014; G06F
2207/00–2207/3896; G06F
2209/00–2209/549; G06F
2211/00–2211/902; G06F
2212/00–2212/7211; G06F 2213/00;
G06F 2213/16–2213/2424
See application file for complete search history.

(56) References Cited

U.S. PATENT DOCUMENTS

| | | | | |
|---|---|---|---|---|
| 5,819,304 | A * | 10/1998 | Nilsen | G06F 12/0253 711/5 |
| 5,835,972 | A * | 11/1998 | Choate | G06F 9/30032 711/220 |
| 6,205,520 | B1 | 3/2001 | Palanca | G06F 9/3824 711/118 |
| 6,223,258 | B1 * | 4/2001 | Palanca | G06F 9/30043 711/133 |
| 6,467,027 | B1 * | 10/2002 | Kyker | G06F 12/0875 711/125 |
| 6,539,471 | B2 * | 3/2003 | Sheaffer | G06F 9/3836 712/217 |
| 6,880,071 | B2 * | 4/2005 | Steele, Jr. | G06F 9/30021 711/141 |
| 7,024,542 | B2 * | 4/2006 | Savransky | G06F 9/3836 712/218 |
| 7,802,078 | B2 | 9/2010 | Henry et al. | |
| 8,543,796 | B2 * | 9/2013 | Falik | G06F 9/30032 712/208 |
| 9,256,433 | B2 * | 2/2016 | Anderson | G06F 9/30181 |
| 9,292,288 | B2 * | 3/2016 | Kadgi | G06F 9/30105 |
| 9,311,250 | B2 * | 4/2016 | Van De Ven | G06F 12/109 |
| 9,396,056 | B2 * | 7/2016 | Sperber | G06F 11/0721 |
| 9,443,280 | B2 * | 9/2016 | Hu | G06T 1/20 |
| 9,996,361 | B2 * | 6/2018 | Mishra | G06F 9/3889 |
| 2002/0147872 | A1 | 10/2002 | Steele, Jr. et al. | |
| 2004/0044873 | A1 | 3/2004 | Wong et al. | |
| 2008/0059955 | A1 | 3/2008 | Koseki et al. | |
| 2008/0282241 | A1 * | 11/2008 | Dong | G06F 9/45533 718/1 |
| 2011/0055480 | A1 * | 3/2011 | Guyetant | G06F 9/4881 711/118 |
| 2011/0320763 | A1 * | 12/2011 | Gonion | G06F 9/3834 711/210 |
| 2014/0032828 | A1 | 1/2014 | Khailany et al. | |
| 2014/0149718 | A1 | 5/2014 | Hughes et al. | |
| 2015/0012575 | A1 * | 1/2015 | Markert | G06F 7/60 708/105 |
| 2017/0177339 | A1 * | 6/2017 | Shanbhogue | G06F 9/3009 |

OTHER PUBLICATIONS

An Essay on Endian Order; Verts, William T.; Apr. 19, 1996; retrieved from https://people.cs.umass.edu/~verts/cs32/endian.html on May 1, 2018 (Year: 1996).*

Definition of resume; Merriam-Webster Online Dictionary; retrieved from https://www.merriam-webster.com/dictionary/resumed on May 5, 2018 (Year: 2018).*

An Adaptive Zero-Copy Strategy for Ubiquitous High Performance Computing; Chien et al.; Proceedings of the 21st European MPI Users' Group Meeting, pp. 139-144; Sep. 9-12, 2014 (Year: 2014).*

Intel, "Intel 64 and IA-32 Architectures Software Developer's Manual", Combined vols. 1, 2A, 2B, 2C, 3A, 3B and 3C, Jun. 2014, pp. 4-305-4-308., Jun. 2014, pp. 4-305-4-308.

Memcpy, "memcpy", Visual Studio 6.0, retrieved on Mar. 1, 2016, 3 pages. web page available at https://msdn.microsoft.com/en-us/library/aa246468(v=vs.60).aspx.

Memmove, "memmove", Visual Studio 6.0, retrieved on Mar. 1, 2016, 3 pages. web page available at https://msdn.microsoft.com/en-us/library/aa246469(v=vs.60).aspx.

International Search Report and Written Opinion received for PCT Patent Application No. PCT/US2017/020625, dated Jun. 8, 2017, 11 pages.

Intel, "Intel 64 and IA-32 Architectures Software Developer's Manual", vol. 1: Basic Architecture, Order No. 253665-040US, Oct. 2011, 548 pages.

Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.

Intel, "Intel 64 and IA-32 Architectures Software Developer's Manual", vol. 3 (3A, 3B & 3C): System Programming Guide, Order No. 325384-040US, Oct. 2011, 1916 pages.

International Preliminary Report on Patentability for Application No. PCT/US2017/020625, dated Oct. 11, 2018, 8 pages.

* cited by examiner

| | 31 | | 0 | |
|---|---|---|---|---|
| 634 | | | AX | EAX |
| | | | BX | EBX |
| | | | CX | ECX |
| | | | DX | EDX |
| | | | | ESI |
| | | | | EDI |
| | | | | EBP |
| | | | | ESP |

FIG. 6

| | 63 | 31 | 0 | |
|---|---|---|---|---|
| 734 | | | EAX | RAX |
| | | | EBX | RBX |
| | | | ECX | RCX |
| | | | EDX | RDX |
| | | | ESI | RSI |
| | | | EDI | RDI |
| | | | EBP | RBP |
| | | | ESP | RSP |
| | | | | R8 |
| | | | | R9 |
| | | | | R10 |
| | | | | R11 |
| | | | | R12 |
| | | | | R13 |
| | | | | R14 |
| | | | | R15 |

METHOD OF PERFORMING MEMORY
COPY INSTRUCTION ON OVERLAPPING
OPERANDS WITH DESCENDING COPY
DIRECTION, WHICH ALLOWS INTERRUPTION
850

851 — RECEIVE MEMORY COPY INSTRUCTION INDICATING START OF SOURCE OPERAND IN MEMORY, START OF DESTINATION OPERAND IN MEMORY, AND INITIAL AMOUNT OF DATA TO COPY, IN WHICH THE OPERANDS OVERLAP

852 — COPY DATA FROM CURRENT END OF SOURCE OPERAND TO CURRENT END OF DESTINATION OPERAND

853 — REDUCE AMOUNT OF DATA REMAINING TO BE COPIED BY AMOUNT OF DATA COPIED

854 — DETERMINE WHETHER TO INTERRUPT MEMORY COPY OPERATION

NO → 855 — ADDITIONAL DATA TO COPY?
 YES → back to 852
 NO → 856 END

YES (from 854) → 857 — STORE REMAINING AMOUNT OF DATA STILL TO BE COPIED IN ARCHITECTURALLY VISIBLE STORAGE LOCATION WITHOUT INDICATING DIFFERENT STARTS OF SOURCE AND DESTINATION OPERANDS THAN THOSE INDICATED BY INSTRUCTION

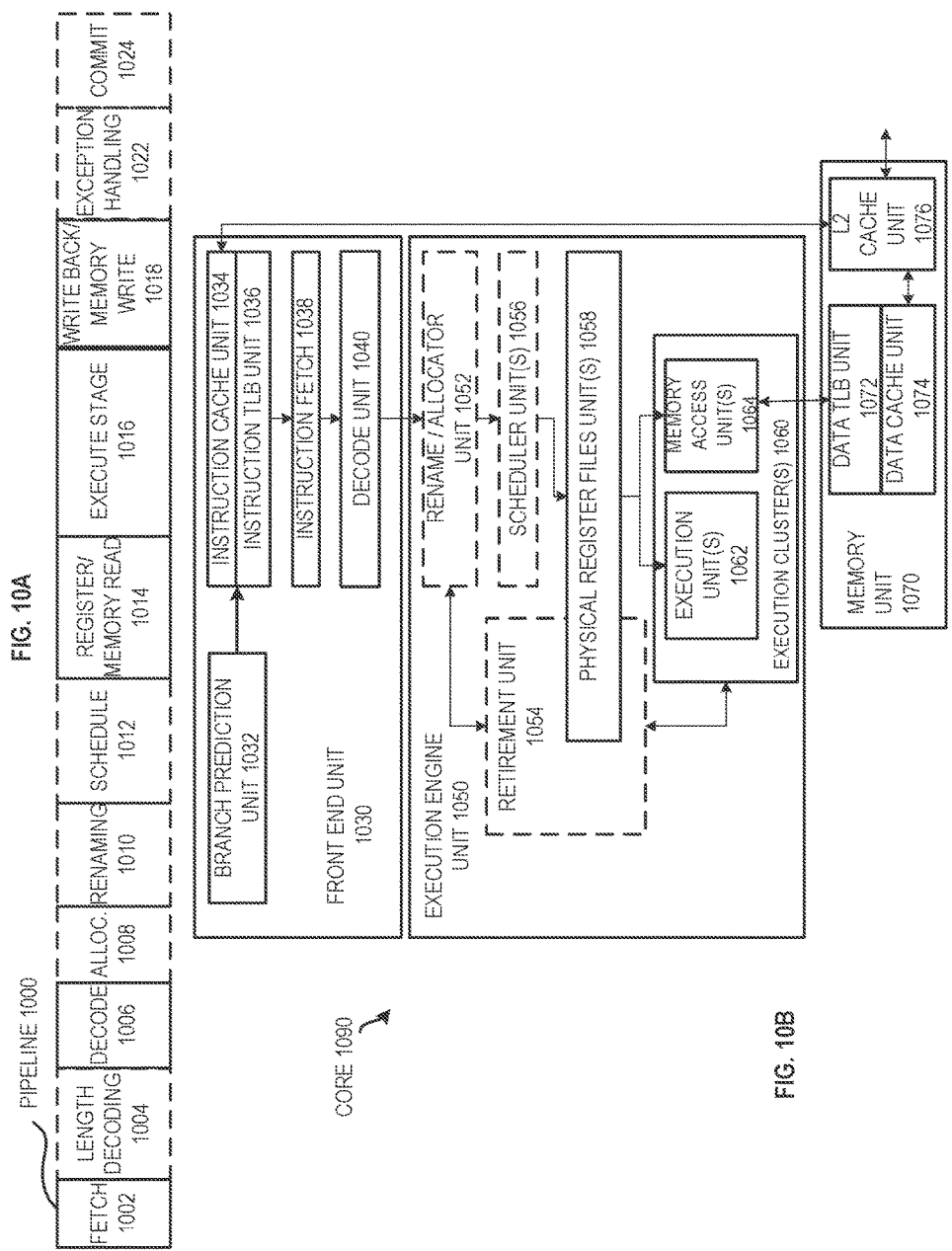

MEMORY COPY INSTRUCTIONS, PROCESSORS, METHODS, AND SYSTEMS

BACKGROUND

Technical Field

Embodiments described herein generally relate to processors. In particular, embodiments described herein generally relate to processors to perform an instruction to copy data from one location in memory to another location in memory.

Background Information

Various different types of data processing systems include a processor and memory. The memory may be used to store software and data. Examples of the software possibly include word processing applications, spreadsheet applications, Internet browser applications, graphics applications, audio applications, and the like. Examples of different types of data include text data, numerical data, graphics data, audio data, and the like, to name just a few examples.

The processor may perform instructions of the software to operate on and/or process the data. These instructions may include machine-level instructions or other instructions of an instruction set of the processor. Various different types of instructions are known in the art to process the data, such as, for example, instructions to load data from memory to the processor, arithmetic and/or logical instructions to process the data, instructions to store data from the processor to memory, and the like.

BRIEF DESCRIPTION OF THE DRAWINGS

The invention may best be understood by referring to the following description and accompanying drawings that are used to illustrate embodiments. In the drawings:

FIG. 6 is a block diagram of an example embodiment of a suitable 32-bit general-purpose register set.

FIG. 7 is a block diagram of an example embodiment of a suitable 64-bit general-purpose register set.

FIG. 8 is a block flow diagram of an embodiment of a method of performing an embodiment of a memory copy instruction on overlapping memory operands with a descending copy direction, which allows for the memory copy instruction to be interrupted.

FIG. 10A is a block diagram illustrating an embodiment of an in-order pipeline and an embodiment of a register renaming out-of-order issue/execution pipeline.

FIG. 10B is a block diagram of an embodiment of processor core including a front end unit coupled to an execution engine unit and both coupled to a memory unit.

DETAILED DESCRIPTION OF EMBODIMENTS

Disclosed herein are memory copy instructions, processors to process or perform the memory copy instructions, methods performed by the processors to process or perform the memory copy instructions, systems incorporating one or more processors to process or perform the memory copy instructions, and machine-readable mediums to store or otherwise provide the memory copy instructions. In some embodiments, the processors may have logic to process or perform the memory copy instructions. In some embodiments, the logic may include a decode unit to decode the memory copy instructions and an execution unit to perform the memory copy instructions. In the following description, numerous specific details are set forth (e.g., specific instruction operations, registers, ways of indicating operands, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
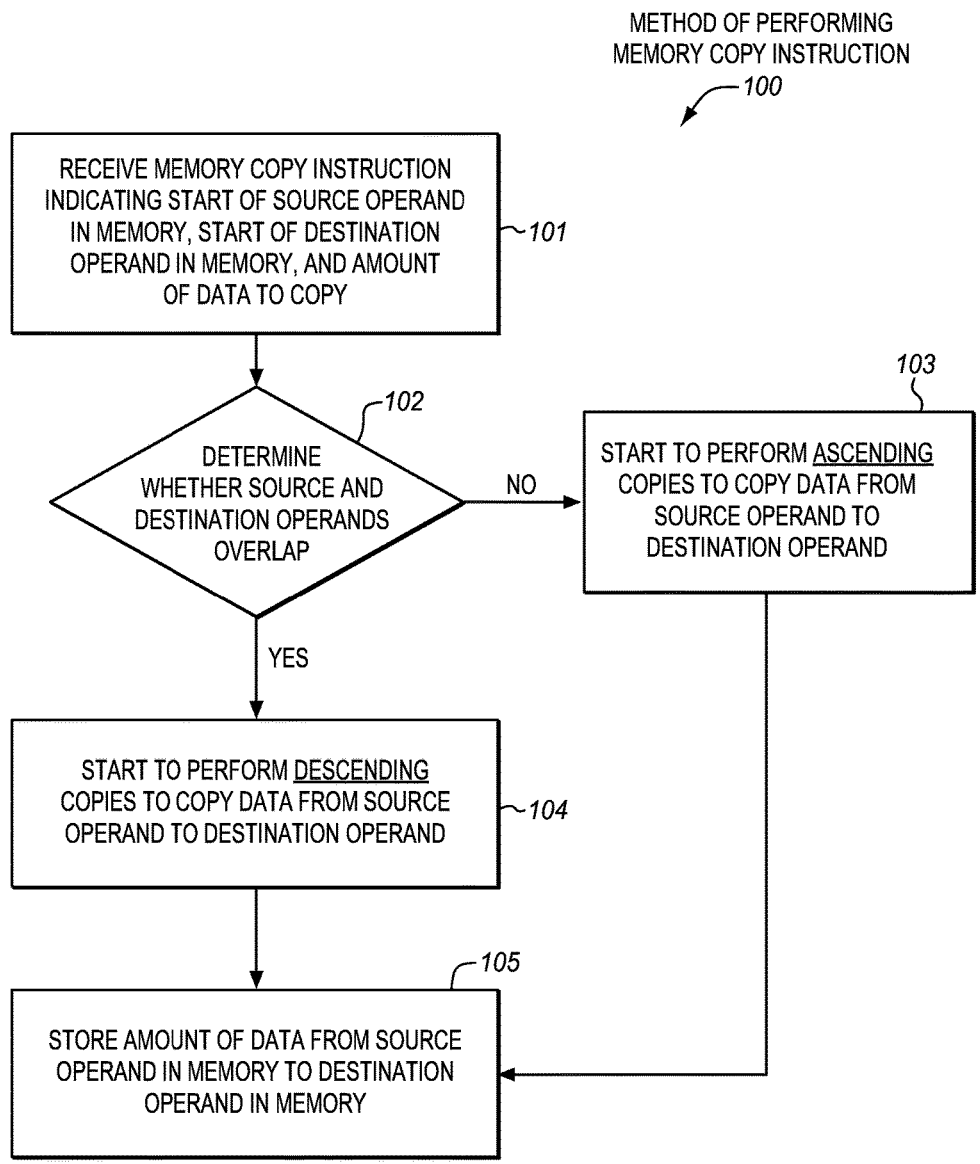
FIG. 1 is a block flow diagram of an embodiment of a method of performing an embodiment of a memory copy instruction.

FIG. 1 is a block flow diagram of an embodiment of a method 100 of processing or performing an embodiment of a memory copy instruction. In various embodiments, the method may be performed by a processor, instruction processing apparatus, digital logic device, integrated circuit, system on chip (SoC), or the like.

The method includes receiving the memory copy instruction, at block 101. In various aspects, the instruction may be received at a processor, SoC, integrated circuit, or the like, or a portion thereof (e.g., an instruction fetch unit, a decode unit, a bus interface unit, etc.). In various aspects, the instruction may be received from an off-processor and/or off-die source (e.g., from off-die memory or a bus or other interconnect), or from an on-processor and/or on-die source (e.g., from an instruction cache, instruction queue, or an on-die memory). The memory copy instruction may represent a macroinstruction, machine code instruction, or other instruction or control signal of an instruction set of the processor.

In some embodiments, the memory copy instruction may explicitly specify (e.g., through one or more fields or a set of bits), or otherwise indicate (e.g., implicitly indicate), each of a start of a source operand in memory, a start of a destination operand in memory, and an amount of data to be copied from the source operand to the destination operand. In various embodiments, the source and destination operands may each represent a string (e.g., an alphanumeric character string), a sequences of data elements (e.g., alphanumeric characters), a data structure including contiguous data elements, or the like. The source and destination operands may also be regarded and referred to simply as a source and destination of the instruction. As used herein, the term "operand" does not imply that any arithmetic, logical, or mathematical operation needs to be performed on the operands. The individual data or data elements may have 8-bit (e.g., byte), 16-bit (e.g., word), (32-bit (e.g., doubleword), or 64-bit (e.g., quadword) granularities. The starting points of the source and destination operands may represent addresses, address information, pointers, offsets, or other indications of the starting or lowest-addressed portion of the source and destination operands. The amount of data to be copied may be expressed in different ways in different embodiments. By way of example, in various embodiments, the amount of data may be expressed as a number of bits, bytes, words, doublewords, quadwords, or data elements to be copied, or as a length of the source operand in bits, bytes, words, doublewords, quadwords, or data elements, or as a size of a string to be copied, or as an address, pointer, offset, or other indication of an end or highest-addressed portion of the source or destination operand.

The starting points of the source and destination operands and the amount of data to be copied may represent inputs or input parameters. These inputs or input parameters may be indicated by the instruction in different ways in different embodiments. As one example, the instruction may have source and/or destination operand specification fields to specify registers, memory locations, or other storage locations that are used to store the start of the source operand, the start of the destination operand, and the amount of data to be copied. As another example, one or more of these registers or other storage locations may optionally be implicit to the instruction (e.g., implicit to an opcode of the instruction). As yet another example, one or more of the start of the source operand, the start of the destination operand, and/or the amount of data to be copied may optionally be specified or otherwise indicated by a field or other portion of the instruction itself instead of being specified or otherwise indicated in a register or other storage location. As one example, a field of the instruction may have a value to indicate an amount of data (e.g., a number of bytes) to be copied. Various combinations of these different approaches may optionally be used.

To further illustrate, in some embodiments, the starting points of the source and destination operands, and the amount of data to be copied, may be specified or otherwise indicated through architectural registers of the processor, integrated circuit, or other apparatus performing the instruction. In some embodiments, these registers may be general-purpose registers (e.g., which may be used in part for address generation as well as general arithmetic and/or logical computation). For example, a first register (e.g., a first general purpose register) may be used to store an address, address information, pointer, offset, or other indication of the starting or lowest-addressed portion of the source operand. Similarly, a second register (e.g., a second general purpose register) may be used to store an address, address information, pointer, offset, or other indication of the starting or lowest-addressed portion of the destination operand. A third register (e.g., a third general purpose register) may be used to store a number of bits, bytes, words, doublewords, quadwords, data elements, an indication of the end of the source or destination operand, or another indication of the amount of data to be copied. To illustrate even further one specific example of a possible Intel® 64 and/or IA-32 Architecture implementation, the general-purpose register ESI (in a 32-bit mode or the register RSI in a 64-bit mode) may optionally be used to store a pointer to the start of the source operand, the general-purpose register EDI (in a 32-bit mode or the register RDI in a 64-bit mode) may optionally be used to store a pointer to the start of the destination operand, and the general-purpose register ECX (in a 32-bit mode or the register RCX in a 64-bit mode) may optionally be used to store the number of bytes to be copied, although the scope of the invention is not so limited. FIGS. 6-7, which will be discussed further below, provides a further discussion of the aforementioned general-purpose registers in Intel® 64 and/or IA-32 Architecture.

At block 102, a determination may be made, responsive to the memory copy instruction, whether or not the source and destination operands overlap, such as, for example, based on a simple subtraction, based on prediction, based on heuristics, or the like. As will be explained further below, whether or not the source and destination operands overlap in memory may change the particular way in which the instruction is performed in order to ensure that correct and/or intended results are achieved (see e.g., the discussion of FIGS. 2-4). Whether or not the source and destination operands overlap generally depends upon the particular input parameters indicated by the instruction (e.g., the indicated starting points of the source and destination operands, and the indicated amount of data to be copied). In some cases the input parameters may be such that the source and destination operands overlap, whereas in other cases the input parameters may be such that the source and destination operands do not overlap. By way of example, if the start of the destination operand is farther away from the start of the source operand than the amount of data to be copied, then it may be determined (e.g., responsive to the instruction being performed) that the source and destination operands do not overlap. Alternatively, if the start of the destination operand is closer to the start of the source operand than the amount of data to be copied, then it may be determined (e.g., responsive to the instruction being performed) that the source and destination operands overlap.

To illustrate further, based on the specific example of the Intel® 64 and/or IA-32 Architecture implementation mentioned above (e.g., in which ESI has the pointer to the start of the source operand, EDI has the pointer to the start of the destination operand, and ECX has the number of bytes to be copied), then such a determination may be made by evaluating whether the difference between the pointer or value stored in EDI minus the pointer or value stored in ESI is greater than the number of bytes to be copied or value stored in ECX (e.g., if (EDI−ESI)>ECX). Or, in a 64-bit mode, such a determination may be made by evaluating whether the difference between the pointer or value stored in RDI minus the pointer or value stored in RSI is greater than the number of bytes to be copied or value stored in RCX (e.g., if (RDI−RSI)>RCX). These specific registers certainly are not required. In one aspect, the comparison for greater than may be performed using an unsigned comparison. Such a simple subtraction or difference is a relatively simple and straightforward way to make the determination of the appropriate copy direction, although more elaborate approaches may optionally be used, if desired. For example, it is contemplated that alternate approaches to determine the copy direction to be used for the copy operation may be based on heuristics, past history, and/or prediction. By way of example, if both copy directions will achieve correct results (e.g., in a case there is no overlap), the processor may choose between either an ascending or descending copy direction based on additional factors, such as, for example, the general machine state, the operands to the instruction, previous decisions made to the instruction (e.g., using history for prediction), or the like. Moreover, those skilled in the art, and having the benefit of the present disclosure, will appreciate that there are various other ways of making such a determination based at least in part on the specific input parameters indicated by the memory copy instruction.

Referring again to FIG. 1, if the source and destination operands do not overlap (i.e., "no" is the determination at block 102), then it may be determined to perform the memory copy instruction and/or its memory copy, move, or other store operations with ascending copies. The method may advance to block 103, where the processor or other integrated circuit may start to perform ascending or forward copies, moves, or other stores to copy or store data from the source operand to the destination operand. The ascending or forward copies may represent copying in the direction from the starts of the operands toward the ends of the operands (e.g., from head to tail) and/or from lower addressed data to higher addressed data. The terms "higher" and "lower" are used herein as relative terms (i.e., relative to one another) not absolute terms. In addition, the operations described herein are often referred to as being "copies" although they may also be implemented as "moves" or other stores from one memory location to another.

To illustrate further, based on the specific example of the Intel® 64 and/or IA-32 Architecture implementation mentioned above (e.g., in which ESI has the pointer to the start of the source operand, EDI has the pointer to the start of the destination operand, and ECX has the number of bytes to be copied as a string or other contiguous sequence of bytes), the ascending or forward copies may be performed as shown by the following pseudocode:

```
While (ECX > 0) {
    [EDI] ← [ESI]   // copy from source operand to destination
operand starting from beginnings
    ESI++, EDI++   // increment starting points since copies
    performed in ascending order
    ECX-- // decrement number of bytes remaining to be copied
}
```

In this pseudocode, the symbol "←" indicates copying or otherwise storing (e.g., copy from ESI to EDI). The symbol "++" indicates incrementing the value in the preceding general-purpose register. The symbol "--" indicates decrementing the value in the preceding general-purpose register. The symbol "//" indicates that a comment follows. Analogous types of copy operations are also contemplated that use three different 32-bit or 64-bit general-purpose registers (e.g., EDI may be replaced by register R1, ECX may be replaced by register R2, and ECX may be replaced by register R3), and in which the input parameters are expressed in various different ways (e.g., four-byte doublewords are copied but the amount of data to be copied is expressed in bytes so it is decremented by four for each data element copied, etc.).

Refer again to FIG. 1. Alternatively, if the source and destination operands do overlap (i.e., "yes" is the determination at block 102), then it may be determined to perform the memory copy instruction and/or its memory copy operations with descending copies. The method may advance to block 104, where the processor or other integrated circuit may start to perform descending or backward copies to copy data from the source operand to the destination operand. The descending or backward copies may represent copying in the direction from the ends of the operands toward the start of each of the operands (e.g., from tail to head) and/or from higher addressed data to lower addressed data.

To illustrate further, based on the specific example of the Intel® 64 and/or IA-32 Architecture implementation mentioned above (e.g., in which ESI has the pointer to the start of the source operand, EDI has the pointer to the start of the destination operand, and ECX has the number of bytes to be copied), the ascending or forward copies may be performed as shown by the following pseudocode:

```
While (ECX > 0) {
    [EDI+(ECX-1)] ← [ESI+(ECX-1)] // copy from source to
destination starting from ends
    ECX--   // decrement number of bytes remaining to be copied
}
```

In this pseudocode, the symbol "←" indicates copying or otherwise storing in the direction of the arrow. The symbol "--" indicates decrementing the value in the preceding general-purpose register. The symbol "//" indicates that a comment follows. Analogous types of copy operations are also contemplated that use three different 32-bit or 64-bit general-purpose registers (e.g., R1, R2, and R3), and in which the input parameters are expressed in various different ways (e.g., one or more of the registers R1, R2, R3 are expressed in a different granularity than one or more others).

As shown by blocks 102-104, the memory copy instruction may be performed with either ascending or descending copies. Moreover, the processor or other integrated circuit, responsive to the memory copy instruction (e.g., responsive to the instruction being decoded, responsive to control signals due to decoding the instruction, etc.), may determine which one of ascending copies and descending copies is to be used (e.g., based on whether or not there is overlap). In some embodiments, the processor or other integrated circuit may be operative to determine such a copy direction, responsive to the memory copy instruction, based primarily or entirely on the input parameters indicated by the memory copy instruction (e.g., any of the input parameters mentioned above). In some embodiments, the copy direction may be determined without using or at least requiring a copy direction hint from software and/or otherwise from outside of the confines of the execution of the memory copy instruction.

Another possible approach is for software to provide a hint or indication of the copy direction and for the instruction to use, rely on, or in some cases be controlled to select a copy direction according to this hint or indication of the copy direction from the software. By way of example, the software may provide the hint or indication by setting a direction flag, bit in a flags register, bit in a status register, or the like, and the performance of the instruction may check this direction flag, bit in a flags register, bit in a status register, or the like, and use the copy direction indicated instead of autonomously determining the copy direction through its own execution/performance. However, such a hint or indication of the copy direction from the software would generally need to be performed by the software outside of the confines of the execution of the memory copy instruction (e.g., before the memory copy instruction is performed to check the hint or indication). Moreover, such a hint or indication of the copy direction from the software would generally involve performing one or more additional instructions (e.g., to see if there is overlap, change the value of the bit, etc.). Accordingly, possible drawbacks with using such a hint or indication of the copy direction from the software is that it may involve performing additional instructions and/or take additional time and/or increase the amount of work that the software needs to do (e.g., make more work for programmers, etc.).

However, in some embodiments, such hints or indications from software may not be used to determine the copy direction, or at least are not required. Rather, as discussed above, the memory copy instruction when performed may be operative to determine the copy direction based on input parameters to the instruction (e.g., by evaluating whether or not there is overlap using a start of a source operand, a start of a destination operand, and an amount of data to copy). In some embodiments, the memory copy instruction when performed may optionally not check for, and may not use, such a software provided hint or indication of the copy direction, when determining the copy direction to use. In some embodiments, there may not be such a hint or indication of a copy direction from software. In some embodiments, the memory copy instruction when performed may be operative to determine the copy direction autonomously (e.g., without help from software) based entirely on the input operands or source operands of the memory copy instruction.

Referring again to FIG. 1, at block 105 the processor or other integrated circuit, in response to and/or as a result of the memory copy instruction, may copy, move, or otherwise store the amount of data (e.g., as indicated by the memory copy instruction) from the source operand in memory to the destination operand in memory. In some embodiments, different portions of the data may be copied, moved, or otherwise stored separately or in discrete portions from one another. For example, a copy, move, or store operation may be repeated a number of times until the entire amount of data has been copied. To illustrate further, based on the specific example of the Intel® 64 and/or IA-32 Architecture implementation mentioned above, in various embodiments, the instruction when performed may be operative to perform any of the following:

(1) store (E)CX bytes from address DS:[(E)SI] to address ES:[(E)DI]
(2) store RCX bytes from address [RSI] to address [RDI]
(3) store (E)CX words from address DS:[(E)SI] to address ES:[(E)DI]
(4) store (E)CX doublewords from address DS:[(E)SI] to address ES:[(E)DI]
(5) store RCX quadwords from address [RSI] to address [RDI]

In the expressions above, DS represents a data segment register and ES represents an extra segment register used to further specify the memory addresses. The brackets around a register (e.g., [RSI]) indicate a memory reference where the value in the register points to a memory address. In this case, in a 64-bit mode the segment registers ES and DS are flat (e.g., segment-base is zero) so the memory-reference is simply the value in the register without a segment register. The (E) indicates an optional/alternate addressing form. For example, in a 64-bit mode the 64-bit general-purpose registers (e.g., RDI) have a 64-bit pointer, whereas in a 32-bit mode, memory can be referenced in different addressing forms, namely using a 32-bit pointer in a 32-bit general-purpose register (e.g., EDI), or using a 16-bit pointer in a 16-bit general-purpose register (e.g., DI).

The method 100 has been shown and described in a relatively basic form, but operations may optionally be added to and/or removed from the method. For example, operations associated with handling an interruption as discussed further below for FIG. 8 may optionally be added (e.g., block 857). In addition, while the flow diagram shows a particular order of operations according to embodiments, that order is exemplary. Alternate embodiments may perform the operations in different order, combine certain operations, overlap certain operations, etc.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, memory addresses may be generated, an execution unit may perform microarchitectural operations to implement the instruction, etc. In some embodiments, the microarchitectural operations to implement the instruction may optionally include using the input parameters of the instruction to determine whether or not the source and destination operands overlap.

Figure 2:
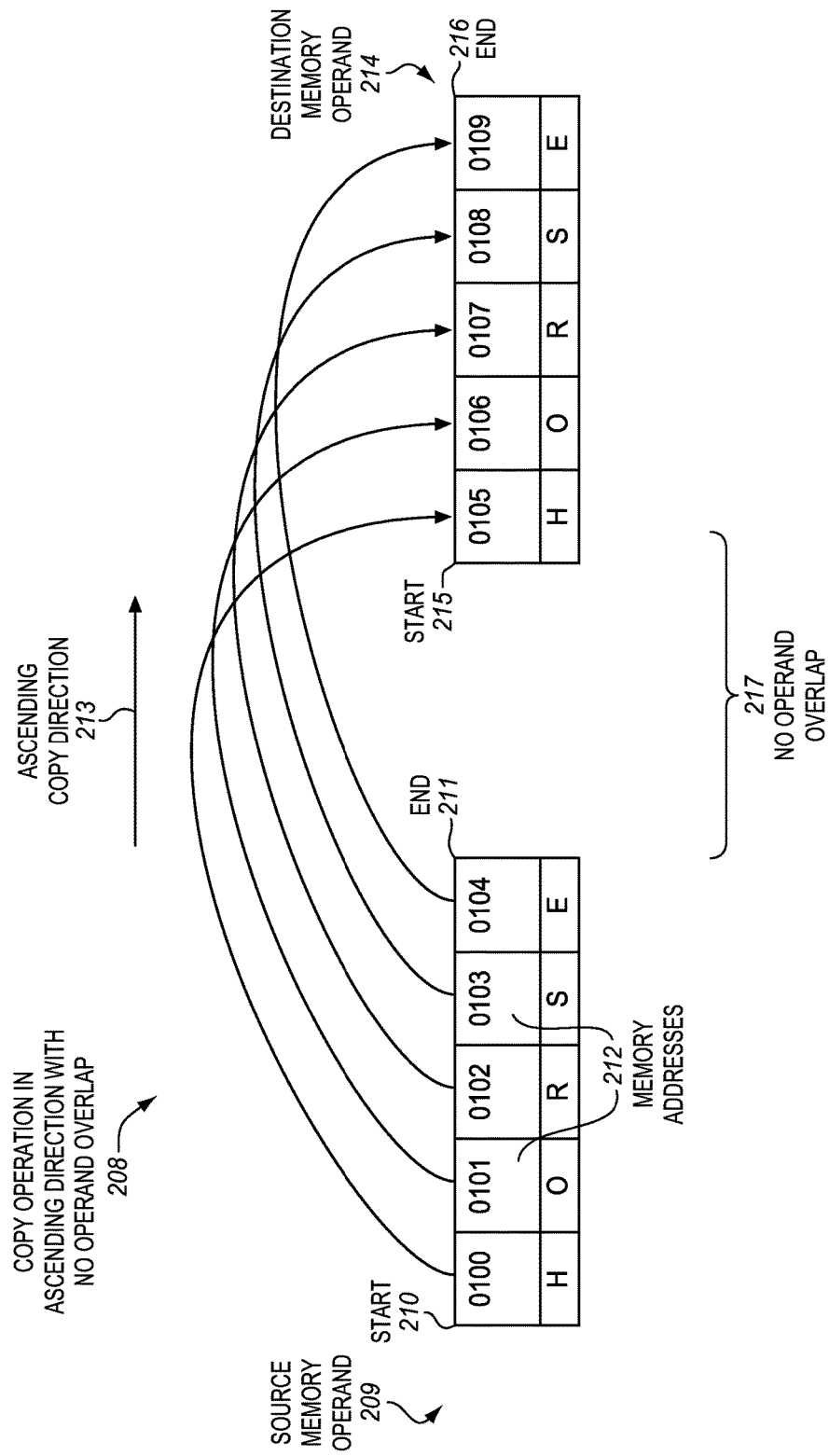
FIG. 2 is a block diagram of a copy operation in an ascending copy direction with no operand overlap.

FIG. 2 is a diagram illustrating a copy operation 208 in an ascending copy direction 213 with no operand overlap 217. The copying is performed from a source memory operand 209 to a destination memory operand 214. As shown in this example, there is no overlap 217 between the source and destination memory operands. For example, the source memory operand of this example occupies memory addresses 212 [0100]-[0104], whereas the destination memory operand occupies memory addresses [0105]-[0109]. In the illustrated example, the source memory operand stores values or characters spelling the word "HORSE." The copying is performed in an ascending copy direction 213. In this ascending copy direction, data is initially copied from a start 210 of the source memory operand to a start 215 of the destination memory operand, and proceeds toward copying data from an end 211 of the source memory operand to an end 211 of the destination memory operand. Individual arrows are used to shown from which source operand locations or memory addresses to which destination operand locations or memory addresses each of the data elements is copied. As shown, the values or characters spelling the word "HORSE" in the source operand are copied to spell the word "HORSE" in the destination operand. In this case, when there is no overlap, none of the source operand starting characters are overwritten due to the copying. In such a case of no overlap, copying in either the ascending direction shown, or in a descending direction, are both suitable. The ascending direction is often used in such a case, since it may often tend to have better performance.

Figure 3:
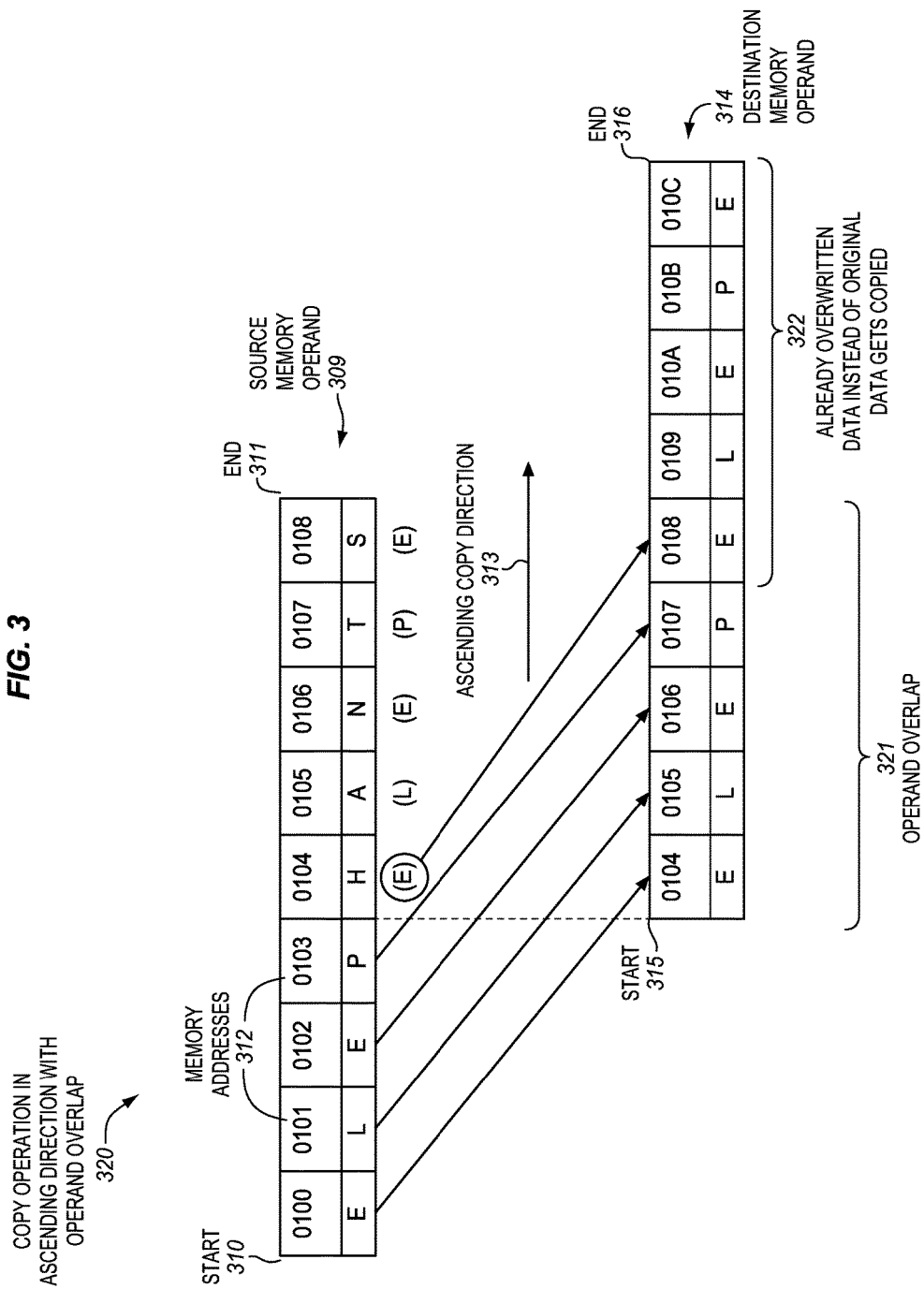
FIG. 3 is a block diagram of a copy operation in an ascending copy direction with operand overlap, and illustrating that initial source data in the overlap region may be overwritten by the copy operation.

FIG. 3 is a diagram illustrating a copy operation 320 in an ascending copy direction 313 with operand overlap 321, and illustrating that initial source data in the overlap region may be overwritten by the copy operation. The copying is performed from a source memory operand 309 to a destination memory operand 314. As shown in this example, there is operand overlap 321 between the source and destination memory operands. For example, the source memory operand of this example occupies memory addresses 312 [0100]-[0108], and the destination memory operand occupies memory addresses [0104]-[010C]. The locations or memory addresses [0104]-[0108] form the region of operand overlap 321 between the source and destination operands. In the illustrated example, the source memory operand stores values or characters spelling the word "ELEPHANTS." The copying is performed in an ascending copy direction 313. In this ascending copy direction, data is initially copied from a start 310 of the source memory operand to a start 315 of the destination memory operand, and proceeds toward copying data from an end 311 of the source memory operand to an end 316 of the destination memory operand. Individual arrows are used to shown from which source operand locations or memory addresses to which destination operand locations or memory addresses a few of the data elements are copied. As shown, the values or characters spelling the word "ELEP" in addresses [0100]-0103] of the source operand may be copied to addresses [0104]-0107] of the source operand. These data elements are before the region of operand overlap 321. However, notice that a different situation occurs when copying in the ascending direction in the region of operand overlap. Specifically, notice that, when copying is performed from address [0104] of the source operand to the corresponding address [0108] of the destination operand, the letter "E" instead of the letter "H" is copied to the destination operand. This is because the letter "E" from address [0100] of the source operand has already overwritten address [0104] in memory earlier in the copy operation (e.g., as shown by the leftmost arrow in the illustration). In other words, some of the starting or initial data in the source operand is overwritten by the copy operation, and lost, before it can be copied to the destination operand. A similar situation exists for other data elements in the region of operand overlap. As a result, the copy operation copies the word "ELEPHANTS" from the source to "ELEPELEPE" in the destination operand. In such a case of overlap, copying in the ascending direction can cause loss of data and erroneous results. As will be discussed further below, such data loss may be encountered if the standard memory copy function memcpy (e.g., available in glibc, Visual Studio 6.0, etc.), is used for overlapping operands in memory, since it has no way to preserve the source data in the overlapping region. Instead, the standard memory copy function memmove may be used when there is operand overlap, although it tends to have slower performance.

Figure 4:
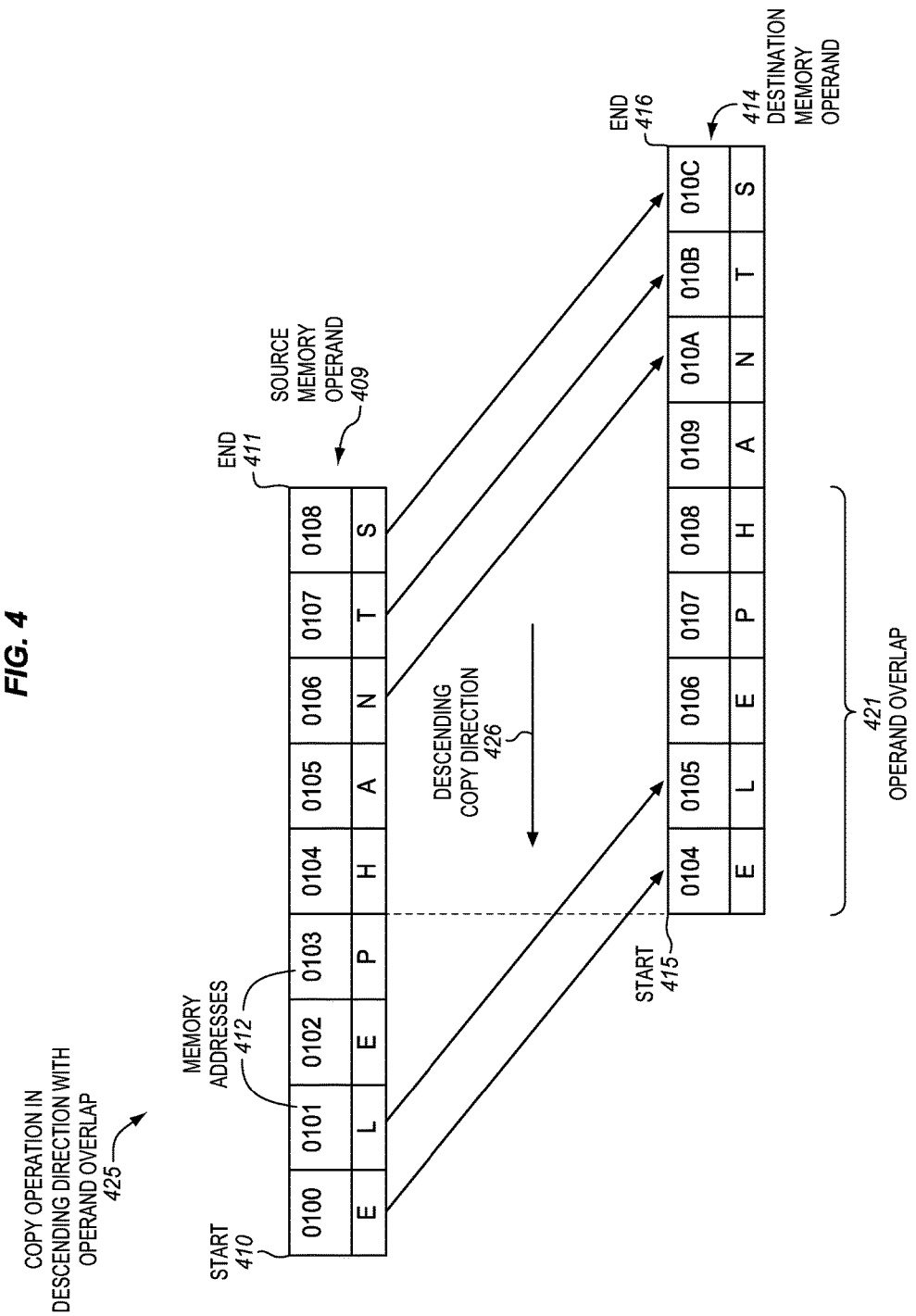
FIG. 4 is a block diagram of a copy operation in a descending copy direction with operand overlap.

FIG. 4 is a diagram illustrating a copy operation 425 in a descending copy direction 426 with operand overlap 421. The copying is performed from a source memory operand 409 to a destination memory operand 414. As shown in this example, there is operand overlap 421 between the source and destination memory operands. For example, the source memory operand of this example occupies memory addresses 412 [0100]-[0108], and the destination memory operand occupies memory addresses [0104]-[010C]. The locations or memory addresses [0104]-[0108] form the region of operand overlap 421 between the source and destination operands. In the illustrated example, the source memory operand stores values or characters spelling the word "ELEPHANTS." The copying is performed in a descending copy direction 426. In this descending copy direction, data is initially copied from an end 411 of the source memory operand to an end 416 of the destination memory operand, and proceeds toward copying data from a start 410 of the source memory operand to a start 415 of the destination memory operand. For example, first the letter "S" is copied, then the letter "T" is copied, then the letter "N" is copied, and so on. Individual arrows are used to shown from which source operand locations or memory addresses to which destination operand locations or memory addresses a few of the data elements are copied. As shown, the values or characters spelling the word "ELEPHANTS" in the source operand may be faithfully copied to spell the word "ELEPHANTS" in the destination operand. Even in the region of operand overlap, when copying in a descending direction, data of the source operand are not overwritten and lost due to the copying. Accordingly, copying in the descending direction may be used, in cases of operand overlap, to avoid overwriting and losing some of the initial or starting source operand data during the copying operation.

Figure 5:
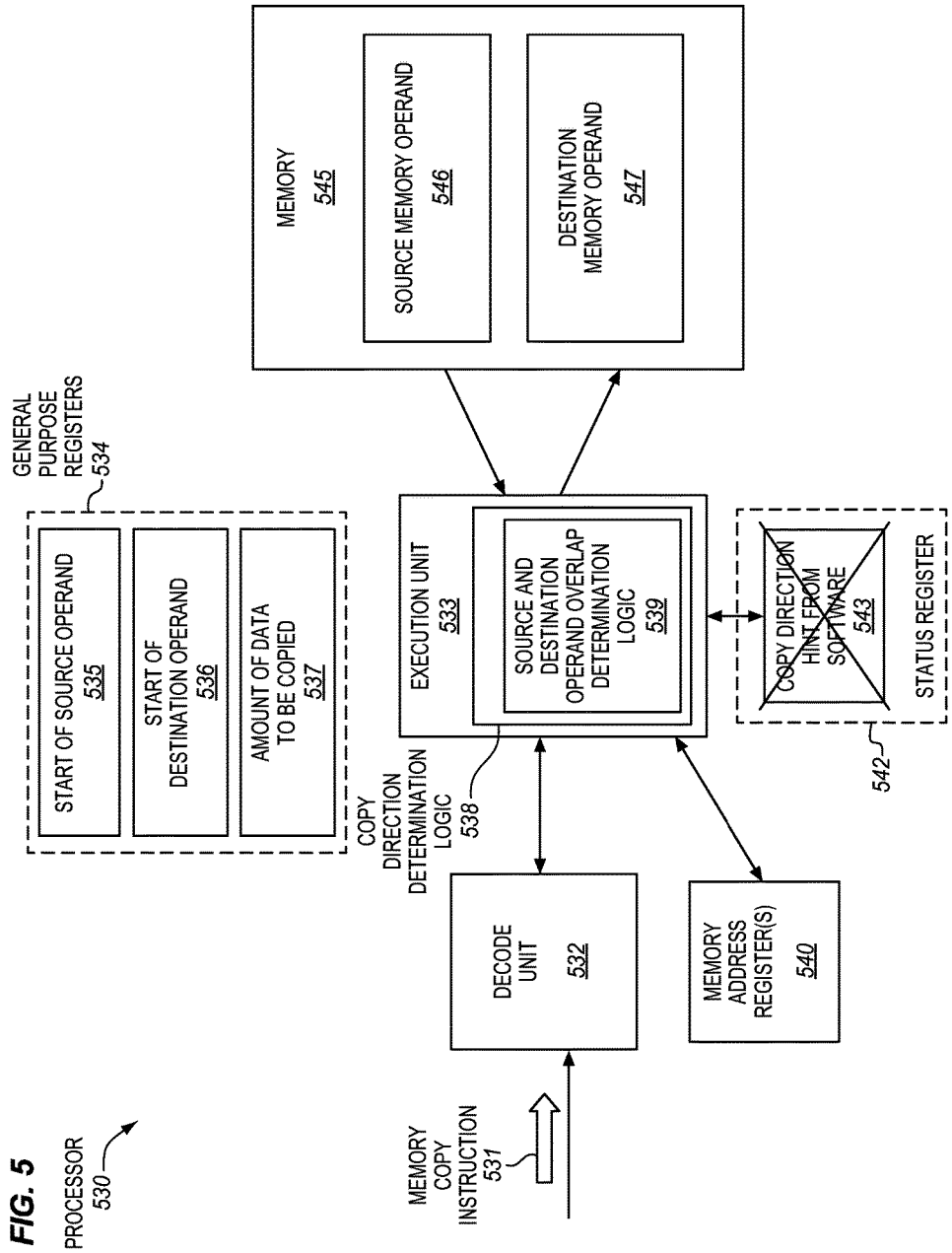
FIG. 5 is a block diagram of an embodiment of a processor that is operative to perform an embodiment of a memory copy instruction.

FIG. 5 is a block diagram of an embodiment of a processor 530 that is operative to perform an embodiment of a memory copy instruction 531. In the illustration a memory 545 is coupled with the processor, although other embodiments pertain to the processor alone without the memory (e.g., the processor before deployed in a system having the memory). In some embodiments, the processor 530 may be operative to perform the method 100 of FIG. 1. The features and specific optional details described herein for the method 100 also optionally apply to the processor 530, which may optionally perform the method. Alternatively, the method 100 may be performed by and/or within a similar or different processor or apparatus. Moreover, the processor 530 may perform methods that are similar to or different than the method 100.

In some embodiments, the processor 530 may be a general-purpose processor (e.g., a general-purpose microprocessor or central processing unit (CPU), for example on a semiconductor die or integrated circuit, of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor 530 may receive the memory copy instruction 531. In various aspects, the instruction may be received from an off-processor and/or off-die source (e.g., from off-die memory or a bus or other interconnect), or from an on-processor and/or on-die source (e.g., from an instruction cache, instruction queue, or an on-die memory). The memory copy instruction may represent a macroinstruction, machine code instruction, or other instruction or control signal of an instruction set of the processor.

In some embodiments, the memory copy instruction may explicitly specify (e.g., through one or more fields or a set of bits), or otherwise indicate (e.g., implicitly indicate), each of a start 535 of a source memory operand 546 in the memory 545, a start 536 of a destination memory operand 547 in the memory, and an amount of data 537 to be copied from the source memory operand 546 to the destination memory operand 547. These inputs or input parameters may be specified or otherwise indicated by the instruction using any of the various different approaches described above for FIG. 1. Moreover, these inputs or input parameters may be represented by any of the various different types of information described above for FIG. 1.

As shown, in some embodiments, the start 535 of the source memory operand, the start 536 of the destination memory operand, and the amount of data 537 to be copied, may each optionally be stored in a different register of a set of general-purpose registers 534 of the processor, although the scope of the invention is not so limited. Each of the general-purpose registers may represent an on-die storage location that is operative to store data. The general-purpose registers may represent architecturally-visible or architectural registers that are visible to software and/or a programmer and/or are the registers indicated by instructions of the instruction set of the processor to identify operands. The general-purpose registers may be implemented in different ways in different microarchitectures and are not limited to any particular type of design. Examples of suitable types of registers include, but are not limited to, dedicated physical registers, dynamically allocated physical registers using register renaming, and combinations thereof. In some embodiments, these general-purpose registers may optionally be any of the general-purpose registers shown and described for FIGS. 6-7, although the scope of the invention is not so limited. In other embodiments, memory locations, or other storage locations, may optionally be used to store one or more of the inputs and/or input parameters of the memory copy instruction.

Referring again to FIG. 1, the processor includes a decode unit or decoder 532. The decode unit may receive and decode the memory copy instruction. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level memory copy instruction. In some embodiments, the decode unit may include one or more input structures (e.g., port(s), interconnect(s), an interface) to receive the memory copy instruction, an instruction recognition and decode logic coupled therewith to recognize and decode the memory copy instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the memory copy instruction being provided directly to the decode unit 532, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the memory copy instruction, which may be of a first instruction set, and may emulate, translate, morph, interpret, or otherwise convert the memory copy instruction into one or more corresponding intermediate instructions or control signals, which may be of a second different instruction set. The one or more intermediate instructions or control signals of the second instruction set may be provided to a decode unit (e.g., decode unit 532), which may decode them into one or more lower-level instructions or control signals executable by native hardware of the processor (e.g., one or more execution units).

In some embodiments, the processor may also include one or more memory address registers that are operative to store memory address information to be used in combination with the start of each of the source and destination operands to address the source and destination memory operands. Examples of suitable memory address register(s) include, but are not limited to, data segment selector register(s), extended segment selector register(s), and the like, or other such memory address registers known in the arts for different architectures. By way of example, the processor may use byte addressing in which the memory is organized and accessed as a sequence of bytes. Byte addresses may be used to address and access one or more bytes in memory within an address space representing the range of memory that can be addressed. With segmented addressing, a program may have multiple independent address spaces known as segments. A byte address may be specified as a combination of the address information from a segment register and further address information (e.g., a byte address) from a general-purpose register (e.g., segment-register:byte-address). For example, the address DS:FF79H may be used to address the byte at address FF79H in the segment pointed by the DS segment register.

Referring again to FIG. 5, an execution unit 533 is coupled with the decode unit 532, is coupled with the source or input parameters (e.g., the start 535 of the source memory operand, the start 536 of the destination memory operand, and the amount of data 537), is coupled with the memory 545, and is coupled with the general-purpose registers 534. The execution unit may receive the one or more decoded or otherwise converted instructions or control signals that represent and/or are derived from the memory copy instruction. The execution unit may also receive the source or input parameters indicated by the instruction. In some embodiments, the execution unit may be operative, in response to and/or as a result of the memory copy instruction (e.g., in response to one or more instructions or control signals decoded from the instruction and/or in response to the instruction being decoded and/or in response to the instruction being provided to a decoder), to determine a copy direction, in which at least the first copy operation (e.g., also others preceding any potential interruption or suspension due to a fault, interrupt, or exception) is to be performed.

In some embodiments, the execution unit may be operative to make such a determination of the copy direction based at least in part on whether or not there is overlap between the source and destination memory operands. As shown, in some embodiments, the execution unit may include copy direction determination logic 538 that includes source and destination memory operand overlap determination logic 539. These logic may be implemented in hardware (e.g., integrated circuitry, transistors or other circuit elements, etc.), firmware (e.g., ROM, EPROM, flash memory, or other persistent or non-volatile memory and microcode, microinstructions, or other lower-level instructions stored therein), software (e.g., higher-level instructions stored in memory), or a combination thereof (e.g., hardware potentially combined with one or more of firmware and/or software). The source and destination memory operand overlap determination logic may be operative to determine whether or not the source and destination memory operands overlap. The logic may be operative to make this determination using any of the approaches previously described above for FIG. 1. For example, this may include determining that there is no overlap if the start of the destination operand is farther away (e.g., in bytes) from the start of the source operand than the amount of data to be copied (e.g., in bytes), or determining that there is overlap if the start of the destination operand is closer to the start of the source operand than the amount of data to be copied.

In some embodiments, the logic may be operative to make this determination using the input parameters indicated by the memory copy instruction and/or one or more parameters derivable therefrom. In some embodiments, based at least in part on such a determination of whether or not there is overlap, the execution unit may be operative to determine the copy direction for at least the first or initial copy operations preceding a possible interruption. In some embodiments, at least when there is overlap the execution unit may determine a descending copy direction. If there is no overlap, then either an ascending or descending copy direction may be used, although in some embodiments the ascending copy direction may be used since it may tend to be more efficient. In some embodiments, the execution unit may be operative to determine the copy direction autonomously, based primarily or in some cases entirely on the input parameters indicated by the memory copy instruction and/or parameters derivable therefrom, without requiring and typically without using a copy direction hint or indication of what copy direction to use provided from software. As shown, the execution is not required to and may not access or check a copy direction hint 543 provided by software (e.g., in a status register 542), and in fact there is no requirement or need for such a copy direction hint 543 to even exist. Alternatively, such a copy direction hint or indication (e.g., a flag or status bit to provide the hint or indication) may optionally/potentially exist in the processor, for example if it is to be used by a different instruction not able to autonomously determine the copy direction.

Referring again to FIG. 5, the execution unit may be operative, in response to and/or as a result of the memory copy instruction, to load, read, or otherwise receive sequentially discrete portions of data from sequential/contiguous data storage locations of the source memory operand 546, and to copy, move, write, or otherwise store these portions of data separately or sequentially to sequential/contiguous data storage locations of the destination memory operand 547 at a different location in the memory. As mentioned, these portions may either proceed in ascending order from the start of each of the operands or in descending order from the ends of the operands. Typically the data may be stored back without modification, although modifications to the data are possible and encompassed for this instruction. The portions may have different data size granularities in different embodiments, such as, for example, byte, word, doubleword, or quadword sizes. These separate sequential copy operations may be repeated multiple times until the entire amount of data (e.g., as indicated by the amount of data 537 to be copied) has been transferred. In one aspect, the instruction may optionally have a repeat prefix, although the scope of the invention is not so limited. The specific examples of copying in ascending or descending order described above in conjunction with FIG. 1 for the specific Intel® 64 and/or IA-32 Architecture general-purpose registers represent one suitable example embodiment of how this may be performed. Analogous types of copy operations are also contemplated that use three different general-purpose registers (e.g., R1, R2, and R3), and in which the input parameters are expressed in various different ways (e.g., one or more of the registers R1, R2, R3 are expressed in a different granularity than one or more others).

The execution unit and/or the processor may include specific or particular logic (e.g., transistors, integrated circuitry, or other hardware potentially combined with firmware (e.g., instructions stored in non-volatile memory) and/or software) that is operative to perform the memory copy instruction. As used herein, the term "execution unit" does not imply and is not limited to a single discrete unit performing all of the aforementioned possible operations. Rather, such operations may potentially be performed by separate or distributed logic that is distributed throughout two or more units or components within a memory subsystem (e.g., a memory unit a memory access unit). As one example, the execution unit may include a combined load/store execution unit to load data from a source and store it to a destination. As another example, the execution unit may include a load unit to load data from a source, and a separate store unit to store the data to a destination, as well as possibly other components/units. For simplicity, and to conform with common usage of the term execution unit to refer to the component that actually executes or performs an instruction, such logic is referred to herein as an execution unit. It may also be stated herein that a memory subsystem and/or a memory unit and/or a memory access unit and/or memory access logic of the processor and/or a memory interface unit or logic of the processor, may be operative to perform the memory copy instruction as disclosed herein.

To avoid obscuring the description, a relatively simple processor 530 has been shown and described. However, the processor may optionally include other processor components. For example, various different embodiments may include various different combinations and configurations of the components shown and described for any of FIGS. 10A/B, 11A/B, 12. All of the components of the processor may be coupled together to allow them to operate as intended.

As previously mentioned, in one or more embodiments, the memory copy instruction may indicate one or more input parameters or operands in one or more general-purpose registers. To further illustrate certain concepts, example embodiments of suitable general-purpose registers available in various Intel® 64 and/or IA-32 Architecture processors will be discussed, although these particular registers certainly are not required.

FIG. 6 illustrates one particular example embodiment of a suitable 32-bit general-purpose register set 634. The 32-bit register set includes eight 32-bit or doubleword general-purpose registers. These registers are referred to as EAX, EBX, ECX, EDX, ESI, EDI, EBP, and ESP. These 32-bit registers are also addressable in 16-bit and 8-bit modes. The lower 16 bits of the EAX, EBX, ECX, and EDX registers are referred to as AX, BX, CX, and DX, respectively. By way of example, word unsigned integers having 16-bits may be stored in the registers BX, CX, and DX, respectively.

FIG. 7 illustrates another particular example embodiment of a suitable 64-bit general-purpose register set 734. The 64-bit register set includes sixteen 64-bit or quadword general-purpose registers. These registers are referred to as RAX, RBX, RCX, RDX, RSI, RDI, RBP, RSP, R8, R9, R10, R11, R12, R13, R14, and R15. These registers are operable in 32-bit mode on 32-bit operands, and operable in 64-bit mode on 64-bit operands. The lower 32-bits of the RAX, RBX, RCX, RDX, RSI, RDI, RBP, and RSP registers respectively correspond to the EAX, EBX, ECX, EDX, ESI, EDI, EBP, and ESP registers. The lower 32-bits of the registers R8-R15 are also addressable in 32-bit mode and are referred to by R8D-R15D. While in the detailed examples above, certain register-to-parameter mappings have been described, different register-to-parameter mappings may alternatively optionally be used. Moreover, each of the aforementioned Intel® 64 and/or IA-32 Architecture processors may more generally be replaced by another register represented generically as R1, R2, and R3, which may each represent any register of a set of general-purpose registers.

FIG. 8 is a block flow diagram of an embodiment of a method 850 of processing or performing an embodiment of a memory copy instruction on overlapping source and destination memory operands with a descending copy direction, which allows for the memory copy instruction to be interrupted. In some embodiments, the method 850 may be performed as a part of, or additional set of interruption related operations that may optionally be added to, the method 100 of FIG. 1. The specific optional characteristics and details of the previously described method 100, and also those of the memory copy instruction performed during the method 100, also optionally apply to the method 850 of FIG. 8. To avoid obscuring the description, the different and/or additional characteristics of the method 850 of FIG. 8, and the memory copy instruction performed during the method, will primarily be described, without repeating the characteristics and details that may optionally be the same or similar. In other embodiments, the method 850 of FIG. 8 may optionally be performed as a part of a similar or different method than the method 100 of FIG. 1, although it may use a memory copy instruction with any of the previously described specific optional characteristics and details.

The method 850 includes receiving the memory copy instruction, at block 851. In some embodiments, the memory copy instruction may explicitly specify, or otherwise indicate, each of a start of a source memory operand in memory, a start of a destination memory operand in memory, and an amount of data to be copied from the source memory operand to the destination memory operand. For this method, assume that the source and destination memory operands overlap. The same options and variations previously described for FIG. 1 may optionally be used for these input parameters and the ways in which they may be indicated by the instruction.

At block 852, a portion of data (e.g., a byte, word, doubleword, or quadword) may be copied from a current end of the source memory operand to a current end of the destination memory operand. In this embodiment, since the source and destination memory operands overlap, a descending copy direction is used in which data elements are copied sequentially starting from the ends of the operands and proceeding in the direction toward the starting points of the operands (e.g., in the direction of decreasing memory addresses).

At block 853, a running indication of the amount of data to be copied may be decremented, decreased, or otherwise reduced by the amount of data actually copied. By way of example, if single 8-bit bytes are being copied one at a time, and the amount of data to copy is expressed in number of bytes, the amount of data to be copied may be decremented by one, whereas if 16-bit words (i.e., each having two bytes) are being copied one at a time, then the amount of data to be copied may be decremented by two, and so on. Or, if the amount of data to be copied is expressed in bits, then it may be reduced by eight for each 8-bit byte copied, and so on. Note that the running indication is not the actual amount of data (e.g., as stored in an architecturally visible storage location) originally indicated by the instruction, but rather may represent a temporary or running variable within the processor which is updated as additional data is copied. For example, the processor may have a temporary register or other storage in which to initially store the amount of data as indicated by the original instruction (e.g., copy a value from a general-purpose register into this temporary register or storage location) and subtraction, decrement, or other logic to reduce the value in this temporary register or storage location as additional data is copied.

In some embodiments, it may be desirable to be able to interrupt or suspend the memory copy instruction at an intermediate point or level of progress before the entire copy operation has completed (e.g., to handle an event needing attention), and then resume performing the memory copy instruction (e.g., after the event has been handled) starting at the intermediate point or level of progress instead of starting over from scratch. For example, this may tend to be the case when relatively larger amounts of data are to be copied (e.g., as in the case of a long or very long string instruction) and/or where relatively longer duration copy operations are performed, since they may tend to be relatively more likely to get interrupted. Also, interruptions can also occur in cases of short memory copy operations. For example, this may be the case when the source and/or destination memory operands are located on a page-boundary, and the subsequent page is indicated as not present (e.g., there a page fault may be delivered to the operating system). Allowing such a restart from the intermediate point or level of progress, instead of starting over from scratch, may help to use work that has already been done and/or help to make forward progress. If instead the operation always started from scratch, there may be no guarantee that the operation will complete within any reasonable amount of time.

Referring again to FIG. 8, at block 854, a determination may be made whether or not to interrupt the execution of the memory copy instruction and/or its operation. In some embodiments, it may be determined to interrupt the performance of the memory copy instruction and/or its operation if a fault (e.g., a page fault), an interrupt, an exception, or certain other such types of events demanding attention occur. Otherwise, it may be determined not to interrupt the instruction and/or operation.

If it is determined not to interrupt the memory copy instruction and/or operation (e.g., "no" is the determination at block 854), the method may advance to block 855. At block 855, a determination may be made whether or not there is additional data to copy. If there is additional data to copy (e.g., "yes" is the determination at block 855), the method may revisit block 852 where more data may be copied. Otherwise, if there is no additional data to copy (e.g., "no" is the determination at block 855), the method may end at block 856 (e.g., the memory copy instruction may be retired or otherwise committed).

Alternatively, if it is determined to interrupt the memory copy instruction and/or operation (e.g., "yes" is the determination at block 854), the method may advance to block 857. When the instruction and/or operation is to be interrupted or suspended, it may be important to preserve or store information about the current amount of copying that has already been performed (e.g., to indicate the current level of progress already made). Such information may be used when the instruction and/or operation is subsequently restarted from the intermediate point instead of starting over from scratch (i.e., without using any of the work already done). In some embodiments, the type of information stored or preserved may be different depending upon whether or not an ascending copy direction or a descending copy direction is being used.

As shown at block 857, in the case of copies being performed in a descending copy direction, the current/updated amount of data still to copy (e.g., as most recently updated/reduced at block 853) may be preserved or stored, in some embodiments. In some embodiments, the current/updated amount of data still to copy may be stored in an architecturally visible storage location (e.g., a general-purpose register). For example, the current/updated amount of data still to copy may be stored to the same register that was used to store the original/initial amount of data to be copied as originally indicated by the memory copy instruction. To further illustrate, with reference again to the specific example of a possible Intel® 64 and/or IA-32 Architecture implementation in which the ECX register in a 32-bit mode (or the RCX register in a 64-bit mode) was used to store the amount of data to copy, this may include writing a different reduced/updated value representing the amount of data not yet copied to the ECX register in a 32-bit mode (or the RCX register in a 64-bit mode). This may be performed by the processor or integrated circuit responsive to the memory copy instruction when there is such an interruption.

As further shown at block 857, in the case of copies being performed in a descending copy direction, indications of a start of each of the source and destination operands that are different than those indicated by the originally received memory copy instruction may not be stored, in some embodiments. In other words, the starting points of the source and destination operands may not be changed, in the case of a descending copy direction. In one aspect, if desired the same starting points of the source and destination operands may optionally be restored to the register over their same original values. In another aspect, if desired the original values of the starting points of the source and destination operands may not be touched and may remain unchanged in their original storage locations.

The method also include storing or preserving the instruction pointer value pointing to the memory copy instruction. In some embodiments, when the operation of the memory copy instruction is interrupted (e.g., due to an exception or external-interrupt), it may be the responsibility of the processor not to update the instruction pointer if the remaining amount of data to be copied is not yet zero. Control may then be passed to a handler (e.g., a page fault handler, exception handler, interrupt handler), operating system, supervisory system software, or the like.

After the event needing attention has been handled, control may be returned to the memory copy instruction. For example, a return instruction may be performed to return control flow back to the stored or preserved instruction pointer value of the memory copy instruction. The memory copy instruction may then be restarted, and the stored or preserved current/updated amount of data still to copy (e.g., as stored at block 857) may be retrieved and used to resume the copy operation at an intermediate point or level of progress. The remaining amount of data to be copied may then be copied and the instruction may complete.

To further illustrate, with reference again to the specific example of the possible Intel® 64 and/or IA-32 Architecture implementation, a specific detailed example of updating the ECX register upon an interruption will be described. Initially, an instruction may indicate the following starting parameters or inputs:

ESI=100 // source memory operand starts at 100
EDI=164 // destination memory operand starts at 164
ECX=256 // 256 bytes is the amount of data to be copied These values indicate that source memory operand bytes [355:100] are to be copied to destination memory operand bytes [419:164]. Notice that the source and destination memory operands overlap, so initially a descending copy operation may be performed. Suppose that a fault, exception, interrupt, or other interruption occurs before the entire descending copy operation has finished. For example, assume this happens after only 192 of the 256 bytes have been copied from bytes [355:164] of the source memory operand to bytes [419:228] of the destination memory operand. Notice that, since a descending copy operation is being performed, the copying is performed from the end or tail to the start or head of the operands.

In some embodiments, the processor responsive to the instruction, and since this is a descending copy operation, may only reduce or change the amount of data to be copied in the ECX register, but may not change the starting points of the source and destination memory operands (e.g., may not change the original values in the ESI and EDI registers). By way of example, if the amount of data to be copied is represented by a number of bytes to copy that is stored in the implicit general-purpose register ECX, then the value in the register ECX may be decremented by the number of bytes already copied at the time of the interruption. For this example, the 256 starting number of bytes to copy originally in this register may be reduced by the 192 bytes already copied such that an updated value of 64 (i.e., 64=256-192) may be stored in register ECX to indicate that 64 bytes remain to be copied when the instruction is resumed.

When the memory copy instruction is resumed, the input parameters to the resumed memory copy instruction may be as follows:

ESI=100 // source memory operand starts at 100
EDI=164 // destination memory operand starts at 164
ECX=64 // 64 bytes is the remaining amount of data to be copied These input parameters may indicate the remaining range of bytes to be copied. Specifically, they may indicate that source memory operand bytes [163:100] are to be copied to destination memory operand bytes [227:164]. Notice that now there is no overlap between the source and destination memory operands. Accordingly, if desired, in some embodiments an ascending copy operation may be performed, without the previously described risk of overwriting some of the source operand data in the overlap region before it has been transferred to the destination operand. For example, if the method 100 of FIG. 1 is performed, block 102 may determine that there is no longer overlap for these modified operands, and may elect to start to perform ascending copies at block 103. Once these 64 remaining bytes have been copied, the bytes copied before the interruption (e.g., 192 bytes) in combination with the bytes copied after the interruption (e.g., 64 bytes) may collectively represent all the bytes initially indicated to be copied by the original memory copy instruction (e.g., 256). At the completion of the memory copy instruction, it is not particularly important what final values are stored in the ESI and EDI registers. In some cases, the values in these registers may not be modified, as discussed above, unless an ascending copy direction is used for part of the operation. Mainly, at the completion of the memory copy instruction, the amount of data to be copied in ECX should be zero. It is possible that the ESI and EDI registers may not be fully updated or may have don't care values upon the completion of the memory copy instruction.

The method 850 has been shown and described in a relatively basic form, but operations may optionally be added to and/or removed from the method. For example, an operation to determine whether the operands overlap (e.g., similar to block 102) may optionally be added. Also, other embodiments a subset of the operations shown (e.g., only blocks 854 and 857, etc.) In addition, while the flow diagrams show a particular order of operations according to embodiments, that order is exemplary. Alternate embodiments may perform the operations in different order, combine certain operations, overlap certain operations, etc.

A method similar to that of FIG. 8 is also contemplated, but for non-overlapping operands, and for an ascending copy direction. In such a method, instead of copying portions of data from the ends of the operands, the data is copied starting from the heads or starting points of the operands, and proceeds in ascending order toward the ends. In addition, while the copying proceeds, temporary or running updated values of the starting points of the source and destination operands may be maintained. In some embodiments, in response to an interrupt for such an ascending copy direction, all three of the updated/current start of the source operand, the updated/current start of the destination operand, and the updated/current amount of data to copy may be stored or otherwise preserved. For example, all three of the registers ESI, EDI, and ECX may be updated or changed to reflect the current level of progress at the time when the interruption occurs.

To further illustrate, reconsider the specific detailed example from above, at the point where copying was restarted in an ascending copy direction to copy the remaining 64 bytes. Assume that ascending copies were performed to copy an additional 5 bytes, and then a second interruption occurred. In some embodiments, in response to the second interrupt for such an ascending copy direction, all three of the registers ESI, EDI, and ECX may be updated or changed to reflect the current level of progress at the time when the second interruption occurs, as follows:

ESI=105 // source memory operand starts at 105
EDI=169 // destination memory operand starts at 169
ECX=59 // 59 bytes is the remaining amount of data to be copied These values indicate that source memory operand bytes [164:105] are to be copied to destination memory operand bytes [228:169]. When resumed, again the source and destination memory operands do not overlap, so an ascending copy operation may be performed to complete the copy operation to copy the remaining 59 bytes from source memory operand bytes [164:105] to destination memory operand bytes [228:169].

Two common standard memory copy functions are memcpy( ) and memmove( ). For example, these memory copy functions are available in glibc, Visual Studio 6.0, etc. The memcpy function copies a count number of bytes of a source buffer in memory to a destination buffer in memory. If the source and destination buffers overlap, this function does not ensure that the original source bytes in the overlapping region are copied before being overwritten. In contrast, the memmove function is able to perform correct copy operations without loss of source data regardless of whether the regions overlap or not. The memmove function copies a count number of bytes of a source buffer in memory to a destination buffer in memory. If a portion of the source and destination buffers overlap, the memmove function ensures that the original source bytes in the overlapping portion are copied or preserved before being overwritten so they are not lost. For example, the memmove function may copy as though the source bytes in the overlapping portion are first copied from the source buffer to a temporary array that does not overlap with the destination, and then the bytes are copied from the temporary array to the destination buffer.

Conventionally, when software with memory copy operations (e.g., memmove, memcpy, etc.), is compiled, the references to standard-functions, for example, like those in the GNU C Library glibc, may be handled either by standard calling mechanism to the library, or by inlining the function within the code itself. However, it may tend to be costly and/or time consuming to update, tune, or otherwise change software that uses the memmove and memcpy functions when changes are made to the architectural and/or microarchitectural implementations of machine level instructions used to implement the memmove and memcpy functions as new processors and/or new processor generations are introduced. Moreover, software implementations that have been optimized at compile time for one architectural and/or microarchitectural implementation may not work optimally on other processors with different architectures and/or microarchitectures.

In some embodiments, a memory copy instruction as disclosed herein may be used to replace a memmove function and/or the memcpy function in software. In some embodiments, the memory copy instruction may replace the memmove function. A method of some embodiments includes compiling or otherwise translating or converting the memmove and/or memcpy functions into corresponding single instances of the memory copy instructions disclosed herein. Instead of inlining the memmove and/or memcpy functions, optionally/potentially each memmove and/or memcpy function (or at least some of them) may instead be replaced during compiling, translation, or the like, one-for-one by a single memory copy instruction.

Figure 9:
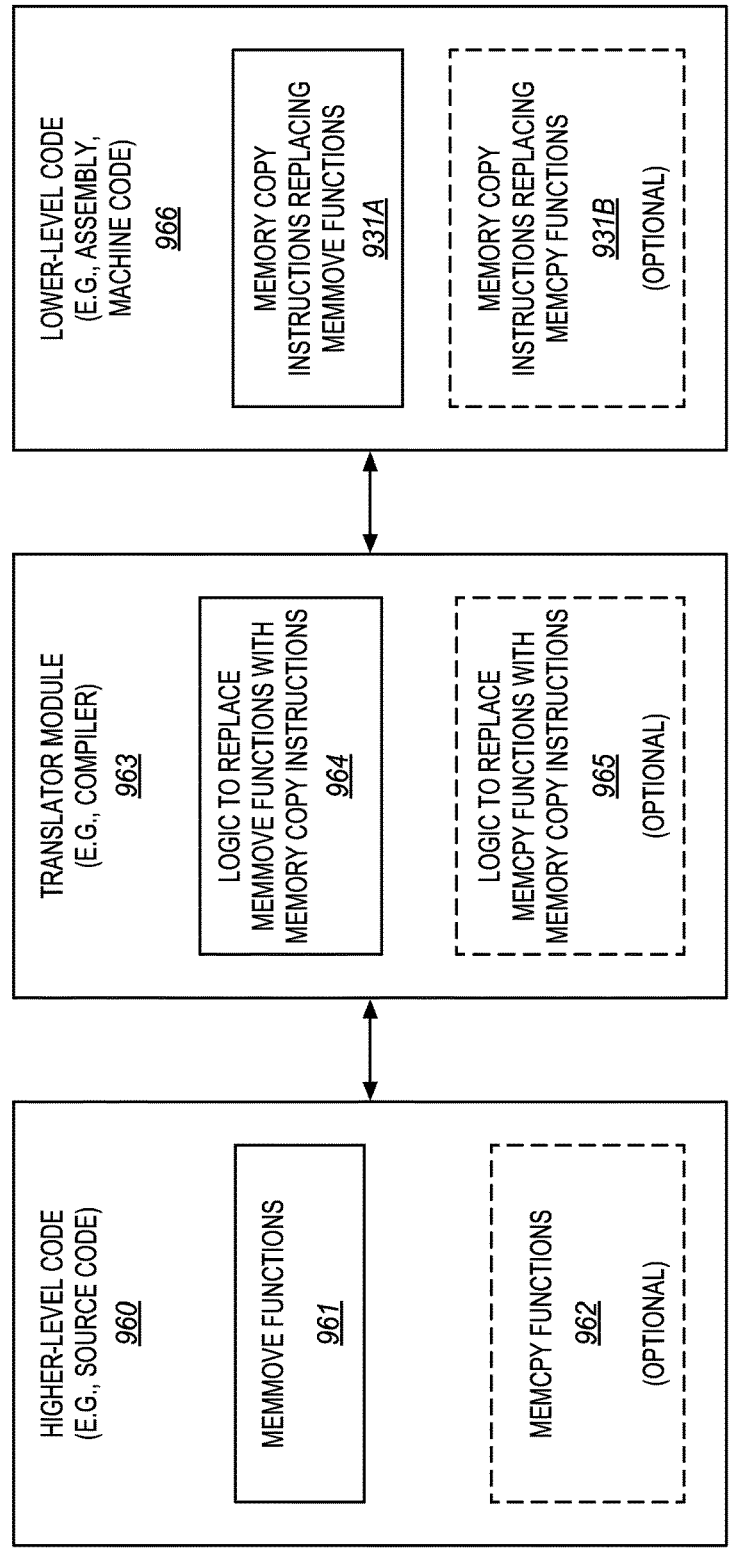
FIG. 9 is a block diagram of an embodiment of a translator module.

FIG. 9 is a block diagram of an embodiment of a compiler or other translator module 963. A higher-level code 960, such as, for example, source code, may be input to the translator module. The higher-level code may include memmove functions 961 and optionally memcpy functions 962. The translator module may be operative to compile or otherwise translate the higher-level code to a lower level code 966, such as, for example, machine code, assembly code, or the like. In some embodiments, the translator module may include logic 964 to replace one or more of the memmove functions 961 of the higher-level code with one or more corresponding memory copy instructions 931A of the lower-level code. In some embodiments, the translator module may optionally include logic 965 to replace one or more of the memcpy functions 962 of the higher-level code with one or more corresponding memory copy instructions 931B of the lower-level code, although this is not required. Alternatively, other instructions may optionally be used for the memcpy functions, such as, for example, the REP MOVSB instruction in Intel® 64 and IA-32 Architectures. However, the REP MOVSB instruction currently cannot be used to replace the memmove function in cases where the source and destination memory operands overlap, or even in cases where a compiler or other translator would not know or know for sure whether or not the source and destination memory operands overlap. The translator module including the logic 964 and the logic 965 may each be implemented in hardware, firmware, software, or various combinations thereof.

Advantageously, replacing such memmove and/or memcpy functions with the memory copy instructions as disclosed herein may help to reduce the number of changes that need to be made to software when there are architectural and/or microarchitectural changes to the implementation of instructions used to perform the memmove and/or memcpy functions the processor even when new processors and new processor generations are introduced. For example, if the processor is extended to use wider registers, the memory copy instructions of the instruction set of the processor and their implementations may natively take this into consideration, rather than needing to change the memmove and/or memcpy functions.

In other embodiments, a similar interconversion approach of converting between memmove instructions and/or memcpy instructions and the memory copy instructions disclosed herein may instead optionally be implemented in other types of translator modules, such as, for example, interpreters, decompilers, assemblers, and disassemblers, to name a few examples.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and out-of-order-core block diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
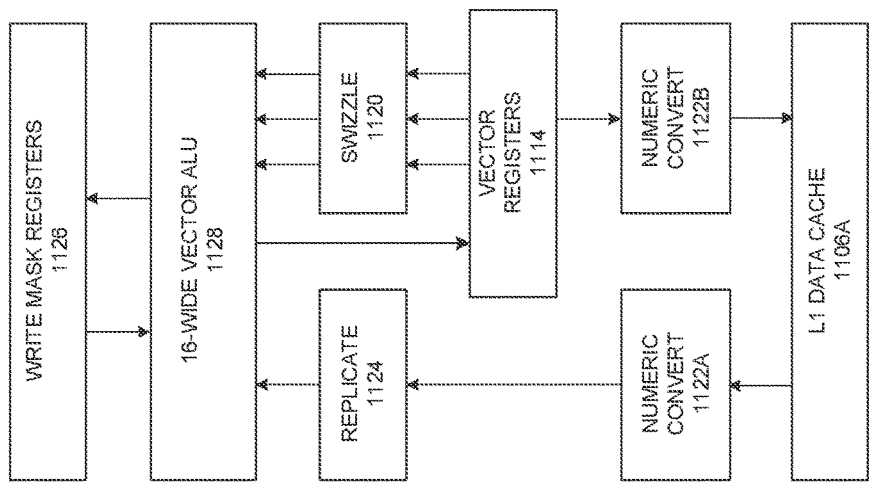
FIG. 11B is a block diagram of an embodiment of an expanded view of part of the processor core of FIG. 11A.
Figure 11A:
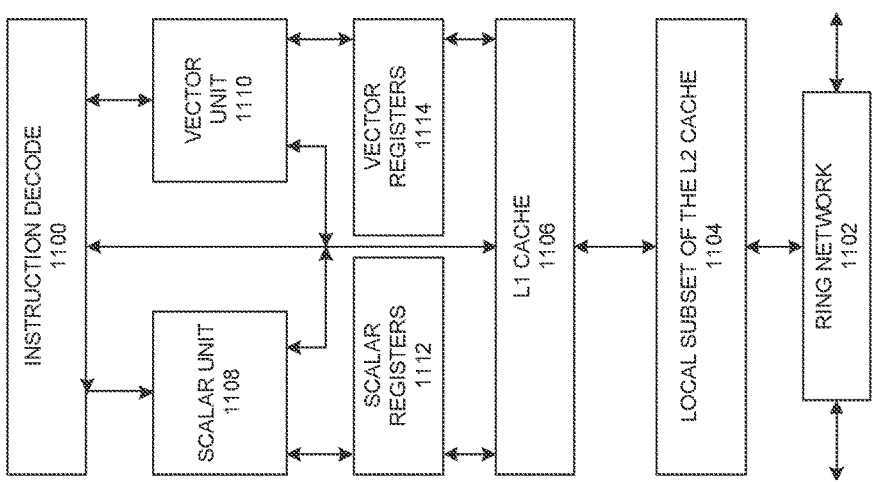
FIG. 11A is a block diagram of an embodiment of a single processor core, along with its connection to the on-die interconnect network, and with its local subset of the Level 2 (L2) cache.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 11112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
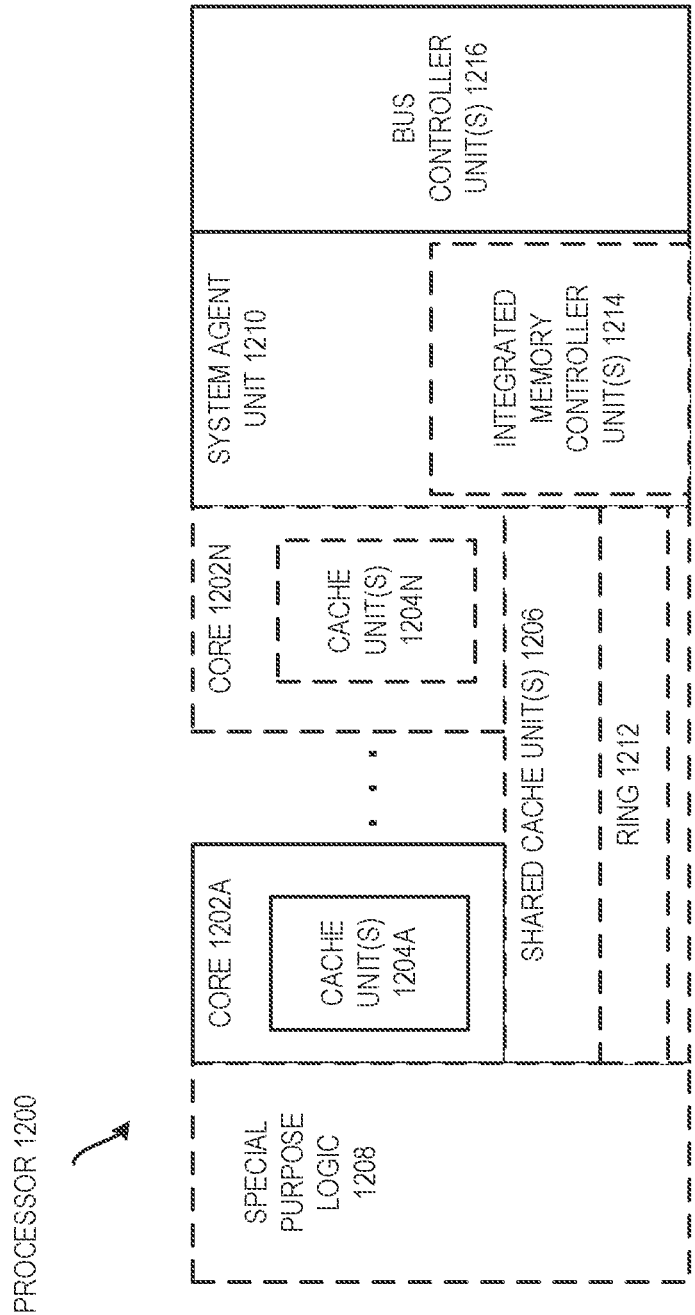
FIG. 12 is a block diagram of an embodiment of a processor that may have more than one core, may have an integrated memory controller, and may have integrated graphics.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
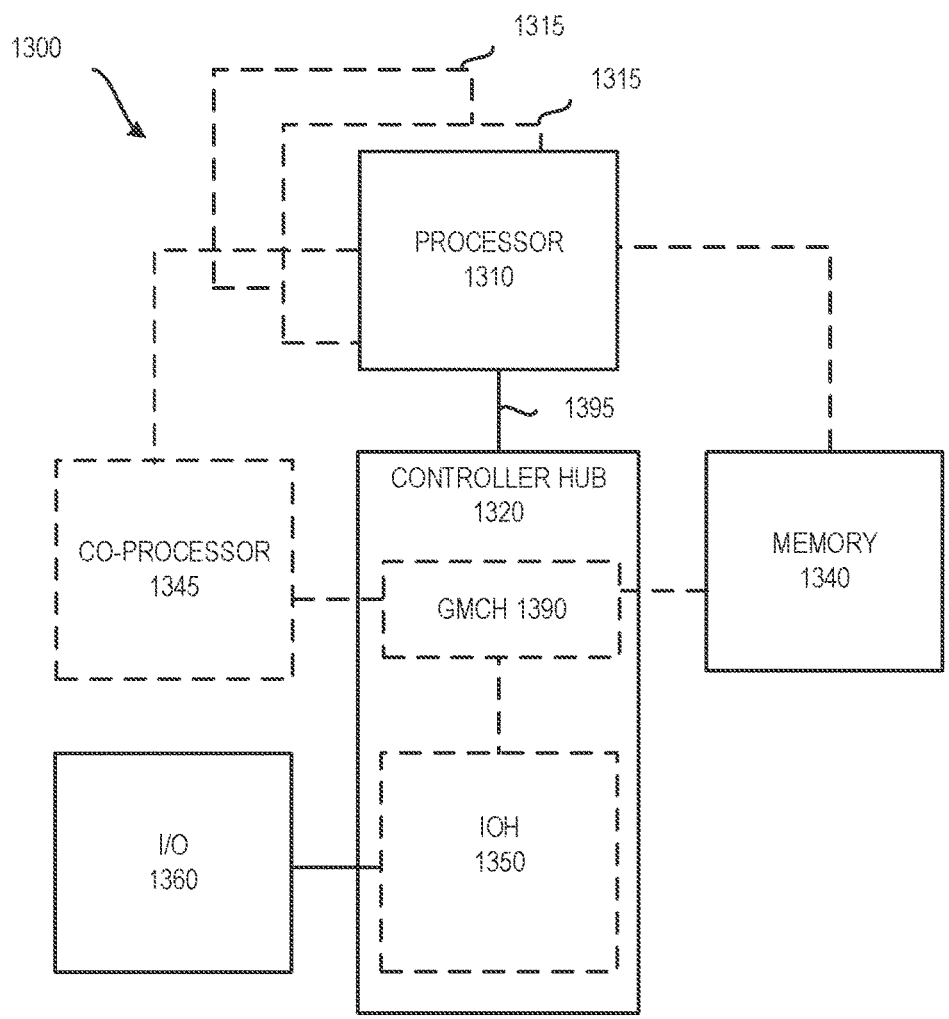
FIG. 13 is a block diagram of a first embodiment of a computer architecture.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
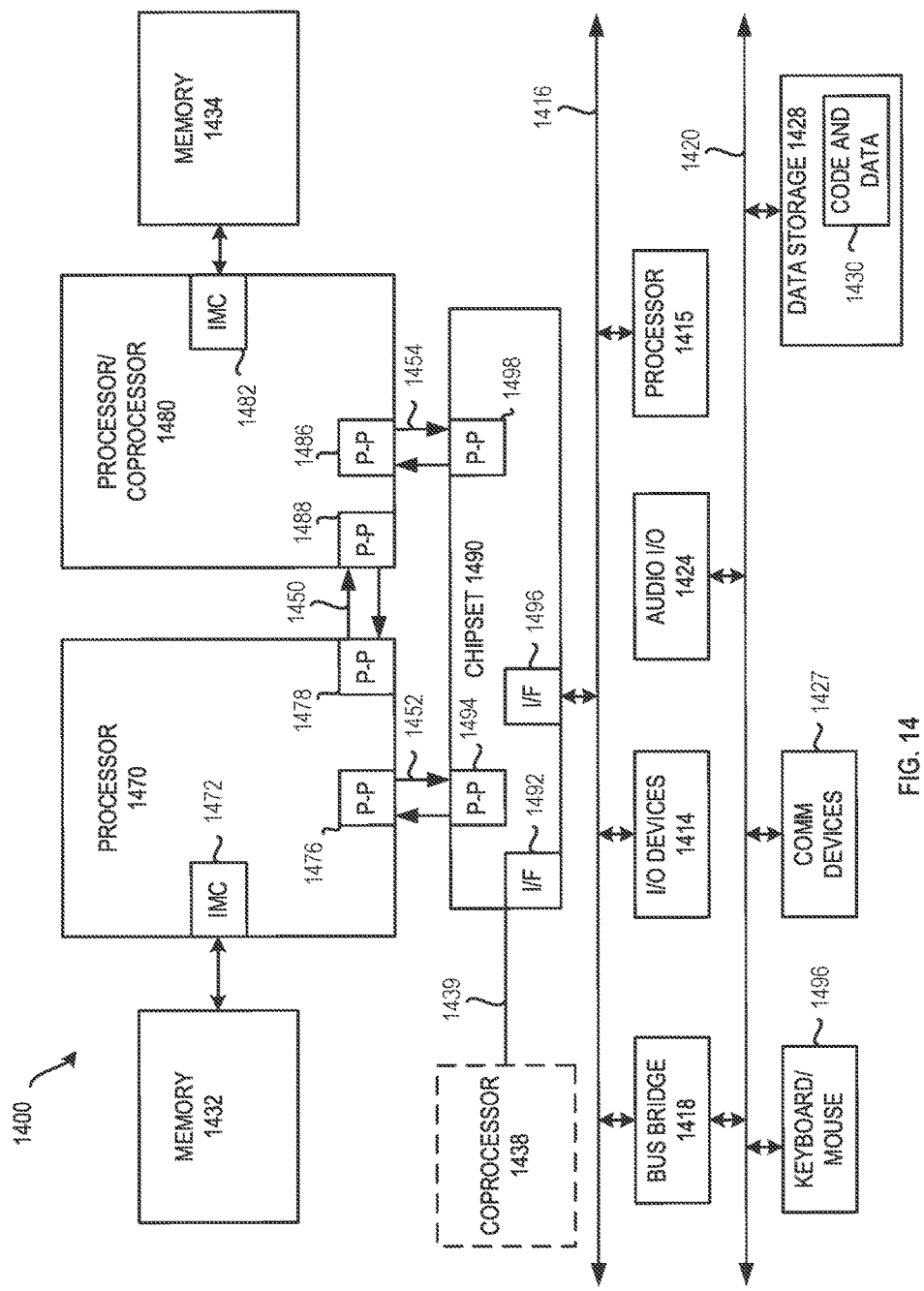
FIG. 14 is a block diagram of a second embodiment of a computer architecture.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
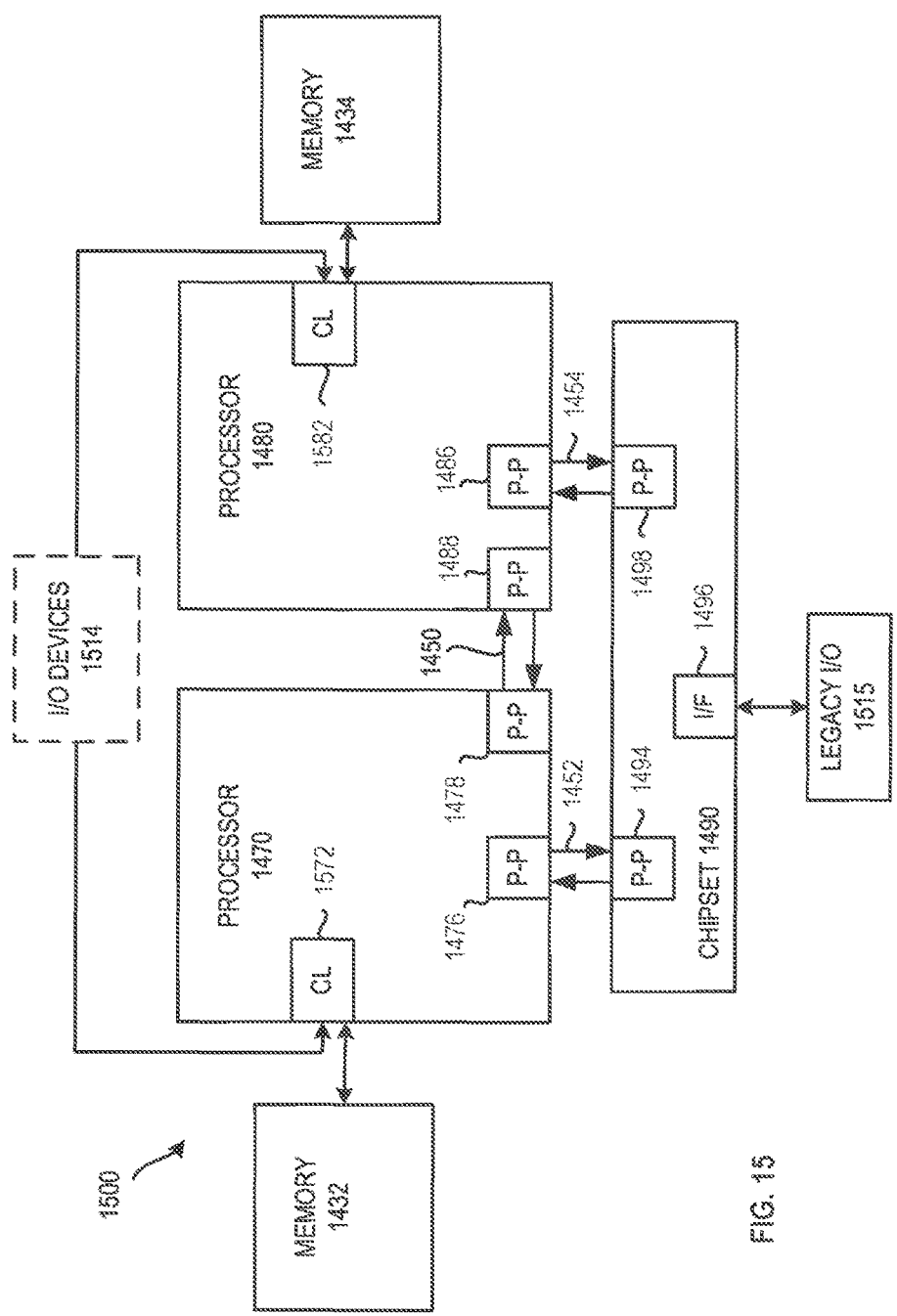
FIG. 15 is a block diagram of a third embodiment of a computer architecture.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1572 and 1582, respectively. Thus, the CL 1572, 1582 include integrated memory controller units and include I/O control logic. FIG. 15 illustrates that not only are the memories 1432, 1434 coupled to the CL 1572, 1582, but also that I/O devices 1514 are also coupled to the control logic 1572, 1582. Legacy I/O devices 1515 are coupled to the chipset 1490.

Figure 16:
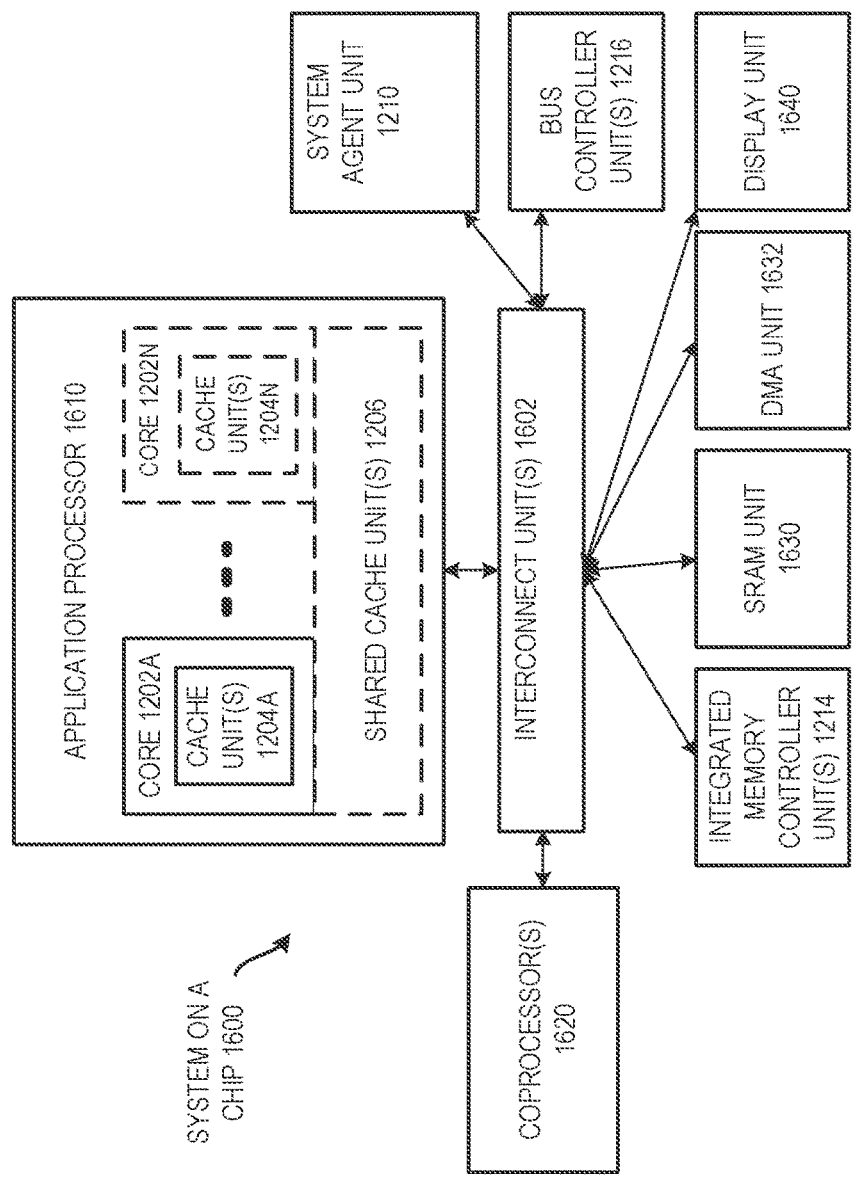
FIG. 16 is a block diagram of a fourth embodiment of a computer architecture.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 152A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
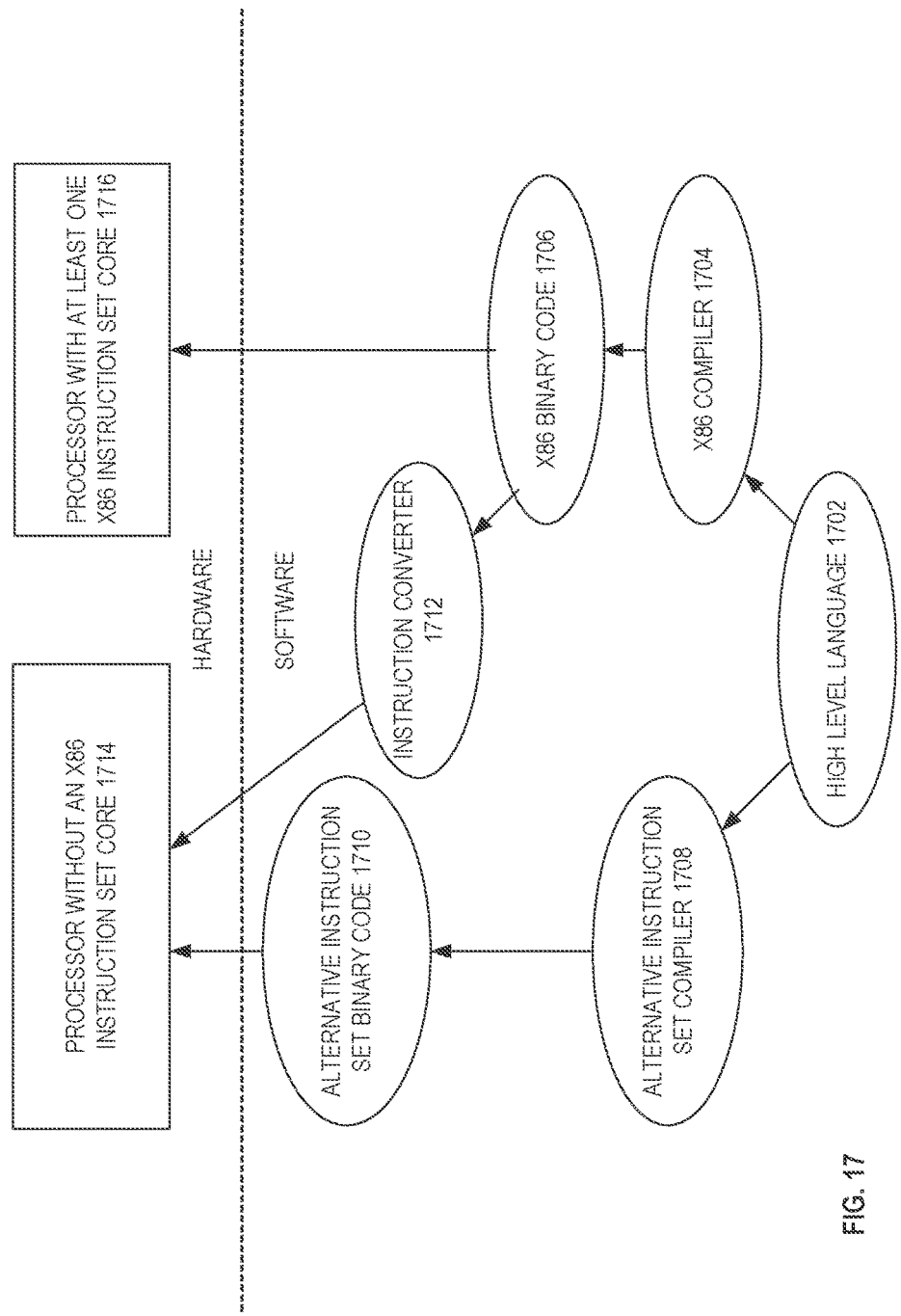
FIG. 17 is a block diagram of use of a software instruction converter to convert binary instructions in a source instruction set to binary instructions in a target instruction set, according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Components, features, and details described for any of the apparatus may also optionally apply to any of the methods, which in embodiments may be performed by and/or with such apparatus. Any of the processors described herein may be included in any of the computer systems disclosed herein (e.g., FIGS. 13-16). The instructions disclosed herein may be performed with any of the processors shown herein, having any of the microarchitectures shown herein, on any of the systems shown herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

In the description and/or claims, the terms "logic," "unit," "module," or "component," may have been used. Each of these terms may be used to refer to hardware, firmware, software, or various combinations thereof. In example embodiments, each of these terms may refer to integrated circuitry, application specific integrated circuits, analog circuits, digital circuits, programmed logic devices, memory devices including instructions, and the like, and various combinations thereof. In some embodiments, these may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a decode unit to decode a memory copy instruction. The instruction is to indicate a start of a source memory operand, is to indicate a start of a destination memory operand, and is to indicate an architecturally visible storage location that is to store an initial amount of data to be copied from the source memory operand to the destination memory operand. The processor also includes an execution unit coupled with the decode unit.

The execution unit, in response to the memory copy instruction, is to copy a first portion of data from the source memory operand to the destination memory operand before an interruption. The first portion of data is to be copied in a descending copy direction. In response to the interruption, and when the first portion of data is to be copied in the descending copy direction, to store a remaining amount of data to be copied in the architecturally visible storage location, but not to indicate a different start of the source memory operand, and not to indicate a different start of the destination memory operand. The remaining amount of data is to represent the initial amount of data less the first portion of data.

Example 2 includes the processor of Example 1, further including a plurality of registers coupled with the execution unit. Also, optionally in which the architecturally visible storage location includes a first register of the plurality of registers.

Example 3 includes the processor of Example 2, in which the first register includes one of a general-purpose register ECX and a general-purpose register RCX.

Example 4 includes the processor of any one of Examples 2 to 3, in which the decode unit is to decode the memory copy instruction that is to indicate a second register of the plurality of registers that is to store the start of the source memory operand, and is to indicate third register of the plurality of registers that is to store the start of the destination memory operand. Also, optionally in which the execution unit, in response to the interruption, and when the first portion of data is to be copied in the descending copy direction, is to change a value in the first register but is not to change values in the second and third registers.

Example 5 includes the processor of any one of Examples 1 to 4, in which the execution unit, in response to the memory copy instruction, is to determine whether the source and destination memory operands overlap based on the start of the source memory operand, the start of the destination memory operand, and the initial amount of data to be copied, and is to copy the first portion of data in the descending copy direction at least at times when the source and destination memory operands overlap.

Example 6 includes the processor of any one of Examples 1 to 4, in which the execution unit, in response to the memory copy instruction, is to determine a copy direction to use to copy the first portion of the data from the source memory operand to the destination memory operand without using an indication of a copy direction generated outside of performance of the memory copy instruction.

Example 7 includes the processor of Example 6, in which the execution unit, in response to the memory copy instruction, is to: (1) determine the copy direction as an ascending copy direction when the source and destination memory operands do not overlap; or (2) determine the copy direction as a descending copy direction when the source and destination memory operands overlap.

Example 8 includes the processor of any one of Examples 1 to 7, in which the initial amount of data to be copied includes an initial number of multi-bit portions of data to be copied that are one of 8-bit, 16-bit, 32-bit, and 64-bit portions of data.

Example 9 is a processor including a decode unit to decode a memory copy instruction. The instruction is to indicate a source memory operand, is to indicate a destination memory operand, and is to indicate an amount of data to be copied from the source memory operand to the destination memory operand. The processor also includes an execution unit coupled with the decode unit. The execution unit, in response to the memory copy instruction, is to determine a copy direction to use to start to copy data from the source memory operand to the destination memory operand without using an indication of a copy direction generated outside of performance of the memory copy instruction.

Example 10 includes the processor of Example 9, in which the execution unit, in response to the memory copy instruction, is to: (1) determine whether the source and destination memory operands overlap; and (2) determine the copy direction based at least in part on the determination of whether the source and destination memory operands overlap.

Example 11 includes the processor of Example 10, in which the execution unit, in response to the memory copy instruction, is to determine whether the source and destination memory operands overlap based on a combination of information selected from a start of the source memory operand indicated by the instruction, a start of the destination memory operand indicated by the instruction, the indicated amount of data to be copied, and parameters derivable therefrom.

Example 12 includes the processor of any one of Examples 10 to 11, in which the execution unit, in response to the memory copy instruction, is to: (1) determine the copy direction as an ascending copy direction when the source and destination memory operands do not overlap; or (2) determine the copy direction as a descending copy direction when the source and destination memory operands overlap.

Example 13 includes the processor of any one of Examples 9 to 12, in which the execution unit, in response to the memory copy instruction, is to determine the copy direction as a descending copy direction when the source and destination memory operands overlap. The execution unit is also to copy a first portion of data from the source memory operand to the destination memory operand before an interruption. The execution unit is also to, in response to the interruption, and when the descending copy direction has been determined as the copy direction, to store a remaining amount of data to be copied in an architecturally visible storage location, but not to indicate a start of the source memory operand that is different from that initially indicated by the memory copy instruction, and not to indicate a start of the destination memory operand that is different from that initially indicated by the memory copy instruction.

Example 14 includes the processor of Example 13, in which the execution unit, in response to the memory copy instruction, is to store the remaining amount of data to be copied in a register that was initially to have been indicated by the memory copy instruction to store the amount of data to be copied, but is not to change values in registers that were initially to have been indicated by the memory copy instruction to store the start of the source memory operand and the start of the destination memory operand.

Example 15 includes the processor of any one of Examples 9 to 12, further including a set of registers. Also, in which the decode unit is to decode the memory copy instruction that is to indicate a first register of the plurality of registers that is to store a start of the source memory operand, to indicate a second register of the plurality of registers that is to store a start of the destination memory operand, and to indicate a third register of the plurality of registers that is to store the amount of data to be copied.

Example 16 includes the processor of any one of Examples 9 to 15, in which the amount of data to be copied includes a number of multi-bit portions of data that are one of 8-bit, 16-bit, 32-bit, and 64-bit portions of data.

Example 17 is a method performed by a processor including receiving a memory copy instruction at the processor. The memory copy instruction indicating a start of a source memory operand, indicating a start of a destination memory operand, and indicating an architecturally visible storage location that stores an initial amount of data to be copied from the source memory operand to the destination memory operand. The method also includes determining, in response to the memory copy instruction, that the source and destination memory operands overlap. The method also includes copying, in response to the memory copy instruction, a first portion of data from the source memory operand to the destination memory operand, in a descending copy direction, before an interruption. The method also includes, in response to the interruption, and since the first portion of data was copied in the descending copy direction, storing a remaining amount of data to be copied, which represents the initial amount of data less the first portion of data, in the architecturally visible storage location, without indicating a different start of the source memory operand, and without indicating a different start of the destination memory operand.

Example 18 includes the method of Example 17, in which storing includes storing the remaining amount of data to be copied in a first general-purpose register.

Example 19 includes the method of Example 18, in which receiving includes receiving the memory copy instruction indicating a second general-purpose storing the start of the source memory operand, indicating a third general-purpose register storing the start of the destination memory operand. Also, in which, in response to the interruption, and since the first portion of data was copied in the descending copy direction, a value stored in the first general-purpose register is changed but values stored in the second and third general-purpose registers are not changed.

Example 20 includes the method of any one of Examples 17 to 19, in which determining includes determining that the source and destination memory operands overlap based on the start of the source memory operand, the start of the destination memory operand, and the initial amount of data to be copied.

Example 21 includes the method of any one of Examples 17 to 19, further including determining to copy the first portion of data in the descending copy direction without using an indication of a copy direction generated outside of performance of the memory copy instruction.

Example 22 includes the method of any one of Examples 17 to 19, further including determining to copy the first portion of data in the descending copy direction based on the determination that the source and destination memory operands overlap.

Example 23 includes the method of any one of Examples 17 to 19, further including determining to copy the first portion of data in the descending copy direction based only on the start of the source memory operand, the start of the destination memory operand, and the initial amount of data to be copied, but not using an indication of a copy direction provided by software.

Example 24 is a computer system including an interconnect and a processor coupled with the interconnect. The processor is to receive a memory copy instruction that is to indicate a start of a source memory operand, is to indicate a start of a destination memory operand, and is to indicate an architecturally visible storage location that is to store an initial amount of data to be copied from the source memory operand to the destination memory operand. The processor, in response to the memory copy instruction, is to copy a first portion of data from the source memory operand to the destination memory operand before an interruption. The first portion of data is to be copied in a descending copy direction. In response to the interruption, and when the first portion of data is to be copied in the descending copy direction, the processor is to store a remaining amount of data to be copied in the architecturally visible storage location, but not to indicate a different start of the source memory operand, and not to indicate a different start of the destination memory operand. The computer system also includes a dynamic random access memory (DRAM) coupled with the interconnect.

Example 25 includes the computer system of Examples 24, in which the processor, in response to the memory copy instruction, is to determine whether the source and destination memory operands overlap based on the start of the source memory operand, the start of the destination memory operand, and the initial amount of data to be copied. The processor is also optionally to determine whether to use an ascending copy direction or the descending copy direction based on whether the source and destination memory operands overlap without using an indication of a copy direction generated outside of the memory copy instruction.

Example 26 includes the processor of any one of Examples 1 to 16, further including an optional branch prediction unit to predict branches, and an optional instruction prefetch unit, coupled with the branch prediction unit, the instruction prefetch unit to prefetch instructions including the memory copy instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the memory copy instruction, in some cases from one of the L1 instruction cache and the L2 cache, and to provide the memory copy instruction to the decode unit. The processor may also optionally include a register rename unit to rename registers, an optional scheduler to schedule one or more operations that have been decoded from the memory copy instruction for execution, and an optional commit unit to commit execution results of the memory copy instruction.

Example 27 includes a system-on-chip that includes at least one interconnect, the processor of any one of Examples 1 to 16 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 28 is a processor or other apparatus operative to perform the method of any one of Examples 17 to 23.

Example 29 is a processor or other apparatus that includes means for performing the method of any one of Examples 17 to 23.

Example 30 is a processor or other apparatus that includes any combination of modules and/or units and/or logic and/or circuitry and/or means operative to perform the method of any one of Examples 17 to 23.

Example 31 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 17 to 23.

Example 32 is a processor or other apparatus substantially as described herein.

Example 33 is a processor or other apparatus that is operative to perform any method substantially as described herein.

Example 34 is a processor or other apparatus that is operative to perform any memory copy instruction substantially as described herein.

What is claimed is:

1. A processor comprising:
a semiconductor die;
a decode unit on the semiconductor die to decode a memory copy instruction of an instruction set of the processor that is to indicate a start of a source memory operand, is to indicate a start of a destination memory operand, and is to indicate an architecturally visible storage location that is to store an initial amount of data to be copied from the source memory operand to the destination memory operand; and
an execution unit coupled with the decode unit, the execution unit, in response to the memory copy instruction, to:
determine to use a descending copy direction, which is to start with higher addressed data and is to end with lower addressed data, using the start of the source memory operand and the start of the destination memory operand;
copy a first portion of data from the source memory operand to the destination memory operand before an interruption, wherein the first portion of data is to be copied in the descending copy direction that is to start with the higher addressed data and is to end with the lower addressed data; and
in response to the interruption, and when the first portion of data is to be copied in the descending copy direction, to store a remaining amount of data to be copied in the architecturally visible storage location, but not to indicate a different start of the source memory operand, and not to indicate a different start of the destination memory operand, wherein the remaining amount of data is to represent the initial amount of data less the first portion of data.

2. The processor of claim 1, further comprising a plurality of registers coupled with the execution unit, and wherein the architecturally visible storage location comprises a first register of the plurality of registers.

3. The processor of claim 2, wherein the first register comprises one of a general-purpose register ECX and a general-purpose register RCX.

4. The processor of claim 2, wherein the decode unit is to decode the memory copy instruction that is to indicate a second register of the plurality of registers that is to store the start of the source memory operand, and is to indicate a third register of the plurality of registers that is to store the start of the destination memory operand, and wherein the execution unit, in response to the interruption, and when the first portion of data is to be copied in the descending copy direction, is to change a value in the first register but is not to change values in the second and third registers.

5. The processor of claim 1, wherein the execution unit, in response to the memory copy instruction, is to determine whether the source and destination memory operands overlap based on the start of the source memory operand, the start of the destination memory operand, and the initial amount of data to be copied, and is to copy the first portion of data in the descending copy direction at least at times when the source and destination memory operands overlap.

6. The processor of claim 1, wherein the execution unit, in response to the memory copy instruction, is to determine the copy direction to use to copy the first portion of the data from the source memory operand to the destination memory operand without using an indication of the copy direction generated outside of performance of the memory copy instruction.

7. The processor of claim 6, wherein the execution unit, in response to the memory copy instruction, is to:
determine the copy direction as the descending copy direction when the source and destination memory operands overlap.

8. The processor of claim 1, wherein the initial amount of data to be copied comprises an initial number of multi-bit portions of data to be copied that are one of 8-bit, 16-bit, 32-bit, and 64-bit portions of data.

9. A processor comprising:
a decode unit to decode a memory copy instruction that is to indicate a source memory operand, is to indicate a destination memory operand, and is to indicate an amount of data to be copied from the source memory operand to the destination memory operand; and
an execution unit coupled with the decode unit, the execution unit, in response to the memory copy instruction, to:
determine a copy direction to use to start to copy data from the source memory operand to the destination memory operand, as one of an ascending copy direction and a descending copy direction, using the source and destination memory operands, without using an indication of a copy direction generated outside of performance of the memory copy instruction, wherein the descending copy direction is to start with higher addressed data and is to end with lower addressed data, and the ascending copy direction into start with lower address data and is to end with higher addressed data.

10. The processor of claim 9, wherein the execution unit, in response to the memory copy instruction, is to:
determine whether the source and destination memory operands overlap; and
determine the copy direction based at least in part on the determination of whether the source and destination memory operands overlap.

11. The processor of claim 10, wherein the execution unit, in response to the memory copy instruction, is to determine whether the source and destination memory operands overlap based on a combination of information selected from a start of the source memory operand indicated by the instruction, a start of the destination memory operand indicated by the instruction, the indicated amount of data to be copied, and parameters derivable therefrom.

12. The processor of claim 10, wherein the execution unit, in response to the memory copy instruction, is to:
determine the copy direction as the ascending copy direction, when the source and destination memory operands do not overlap; or determine the copy direction as the descending copy direction, when the source and destination memory operands overlap.

13. The processor of claim 9, wherein the execution unit, in response to the memory copy instruction, is to:
determine the copy direction as the descending copy direction, when the source and destination memory operands overlap;
copy a first portion of data from the source memory operand to the destination memory operand before an interruption; and
in response to the interruption, and when the descending copy direction has been determined as the copy direction, to store a remaining amount of data to be copied in an architecturally visible storage location, but not to indicate a start of the source memory operand that is different from that initially indicated by the memory copy instruction, and not to indicate a start of the destination memory operand that is different from that initially indicated by the memory copy instruction.

14. The processor of claim 13, wherein the execution unit, in response to the memory copy instruction, is to store the remaining amount of data to be copied in a register that was initially to have been indicated by the memory copy instruction to store the amount of data to be copied, but is not to change values in registers that were initially to have been indicated by the memory copy instruction to store the start of the source memory operand and the start of the destination memory operand.

15. The processor of claim 9, further comprising a set of registers, and wherein the decode unit is to decode the memory copy instruction that is to indicate a first register of the set of registers that is to store a start of the source memory operand, to indicate a second register of the set of registers that is to store a start of the destination memory operand, and to indicate a third register of the set of registers that is to store the amount of data to be copied.

16. The processor of claim 9, wherein the amount of data to be copied comprises a number of multi-bit portions of data that are one of 8-bit, 16-bit, 32-bit, and 64-bit portions of data.

17. A method performed by a processor comprising:
receiving a memory copy instruction at the processor, and decoding the memory copy instruction with a decode unit on a die of the processor, the memory copy instruction being of an instruction set of the processor and indicating a start of a source memory operand, indicating a start of a destination memory operand, and indicating an architecturally visible storage location that stores an initial amount of data to be copied from the source memory operand to the destination memory operand;
determining, in response to the memory copy instruction, that the source and destination memory operands overlap;
copying, in response to the memory copy instruction, a first portion of data from the source memory operand to the destination memory operand, in a descending copy direction that proceeds from higher addressed data to lower addressed data, before an interruption; and
in response to the interruption, and since the first portion of data was copied in the descending copy direction, storing a remaining amount of data to be copied, which represents the initial amount of data less the first portion of data, in the architecturally visible storage location, without indicating a different start of the source memory operand, and without indicating a different start of the destination memory operand.

18. The method of claim 17, wherein storing comprises storing the remaining amount of data to be copied in a first general-purpose register.

19. The method of claim 18, wherein receiving comprises receiving the memory copy instruction indicating a second general-purpose register storing the start of the source memory operand, indicating a third general-purpose register storing the start of the destination memory operand, and wherein, in response to the interruption, and since the first portion of data was copied in the descending copy direction, a value stored in the first general-purpose register is changed but values stored in the second and third general-purpose registers are not changed.

20. The method of claim 17, wherein determining comprises determining that the source and destination memory operands overlap based on the start of the source memory operand, the start of the destination memory operand, and the initial amount of data to be copied.

21. The method of claim 17, further comprising determining to copy the first portion of data in the descending copy direction without using an indication of a copy direction generated outside of performance of the memory copy instruction.

22. The method of claim 17, further comprising determining to copy the first portion of data in the descending copy direction based on the determination that the source and destination memory operands overlap.

23. The method of claim 17, further comprising determining to copy the first portion of data in the descending copy direction based only on the start of the source memory operand, the start of the destination memory operand, and the initial amount of data to be copied, but not using an indication of a copy direction provided by software.

24. A computer system comprising:
an interconnect;
a processor coupled with the interconnect, the processor to receive a memory copy instruction of an instruction set of the processor and that is to indicate a start of a source memory operand, is to indicate a start of a destination memory operand, and is to indicate an architecturally visible storage location that is to store an initial amount of data to be copied from the source memory operand to the destination memory operand, the processor having an on-die decode unit to decode the memory copy instruction and an execution unit to execute the memory copy instruction, the processor, in response to the memory copy instruction, to determine to use a descending copy direction, which is to start with higher addressed data and is to end with lower addressed data, using the start of the source memory operand and the start of the destination memory operand, copy a first portion of data from the source memory operand to the destination memory operand before an interruption, wherein the first portion of data is to be copied in the descending copy direction that is to start with the higher addressed data and is to end with the lower addressed data, and in response to the interruption, and when the first portion of data is to be copied in the descending copy direction, to store a remaining amount of data to be copied in the architecturally visible storage location, but not to indicate a different start of the source memory operand, and not to indicate a different start of the destination memory operand; and
a dynamic random access memory (DRAM) coupled with the interconnect.

25. The computer system of claim 24, wherein the processor, in response to the memory copy instruction, is to determine whether the source and destination memory operands overlap based on the start of the source memory operand, the start of the destination memory operand, and the initial amount of data to be copied, and is to determine whether to use an ascending copy direction or the descending copy direction based on whether the source and destination memory operands overlap without using an indication of a copy direction generated outside of the memory copy instruction.

* * * * *

UNITED STATES PATENT AND TRADEMARK OFFICE
CERTIFICATE OF CORRECTION

| | |
|---|---|
| PATENT NO. | : 10,261,790 B2 |
| APPLICATION NO. | : 15/086686 |
| DATED | : April 16, 2019 |
| INVENTOR(S) | : Michael Mishaeli |

It is certified that error appears in the above-identified patent and that said Letters Patent is hereby corrected as shown below:

In the Claims

In Column 37, Claim 9, Line 46, after "the ascending copy direction", delete "into"; and insert --is to--.

Signed and Sealed this
First Day of November, 2022

Katherine Kelly Vidal
*Director of the United States Patent and Trademark Office*